US010796267B2

(12) United States Patent
Baker et al.

(10) Patent No.: US 10,796,267 B2
(45) Date of Patent: Oct. 6, 2020

(54) INSTRUMENT INVENTORY SYSTEM AND METHODS

(71) Applicant: RST Automation LLC, Bronx, NY (US)

(72) Inventors: Russell Baker, Sunnyside, NY (US); Lawrence Zelner, New York, NY (US); David Berk, East Brunswick, NJ (US)

(73) Assignee: RST AUTOMATION LLC, Bronx, NY (US)

(*) Notice: Subject to any disclaimer, the term of this patent is extended or adjusted under 35 U.S.C. 154(b) by 572 days.

(21) Appl. No.: 14/620,084

(22) Filed: Feb. 11, 2015

(65) Prior Publication Data
US 2015/0324739 A1 Nov. 12, 2015

Related U.S. Application Data

(60) Provisional application No. 61/990,273, filed on May 8, 2014.

(51) Int. Cl.
G06Q 10/08 (2012.01)

(52) U.S. Cl.
CPC ........... *G06Q 10/08* (2013.01); *G06Q 10/087* (2013.01)

(58) Field of Classification Search
CPC .......................... G06Q 10/087; G06Q 10/08
USPC ............................................................ 705/28
See application file for complete search history.

(56) References Cited

U.S. PATENT DOCUMENTS

| 4,862,357 | A | 8/1989 | Ahlstrom et al. |
| 5,805,456 | A | 9/1998 | Higham et al. |
| 7,463,947 | B1 | 12/2008 | Frederick et al. |
| 7,837,694 | B2 | 11/2010 | Tethrake et al. |
| 8,301,296 | B2 | 10/2012 | Grundmann et al. |
| 8,326,354 | B2 | 12/2012 | Ahn |
| 8,567,880 | B2 | 10/2013 | Treat et al. |
| 8,600,545 | B2 | 12/2013 | Earlam |
| 9,524,485 | B1 * | 12/2016 | Shakes ................. G06Q 10/087 |
| 2005/0154612 | A1 * | 7/2005 | Smith ................... G06Q 50/22 705/2 |

(Continued)

FOREIGN PATENT DOCUMENTS

| WO | WO8527252 | 10/1995 |
| WO | WO 2009076452 | 6/2009 |
| WO | WO2013102900 | 7/2013 |

OTHER PUBLICATIONS

International Search Report of the International Searching Authority dated Aug. 7, 2015 for PCT/US2015/029924.

(Continued)

*Primary Examiner* — Florian M Zeender
*Assistant Examiner* — Christopher R Buchanan
(74) *Attorney, Agent, or Firm* — Arent Fox LLP

(57) ABSTRACT

Embodiments of the instrument inventory system create, record and enable access of data about collections of instruments and tools such as surgical instruments and dental instruments. The instrument inventory system includes at least one user interface, at least one instrument interface, an instrument processor and a database storing instrument records. The instrument inventory system includes a training function which enables the system to create a data record for new instruments when the system encounters new instruments.

23 Claims, 37 Drawing Sheets

(56) References Cited

U.S. PATENT DOCUMENTS

| | | | |
|---|---|---|---|
| 2007/0203811 A1* | 8/2007 | Hoopes | G06Q 10/087 |
| | | | 705/28 |
| 2010/0174415 A1 | 7/2010 | Humayun et al. | |
| 2010/0252626 A1 | 10/2010 | Elizondo et al. | |
| 2011/0114522 A1 | 5/2011 | Alston et al. | |
| 2013/0229536 A1 | 9/2013 | Boncyk et al. | |
| 2013/0336554 A1* | 12/2013 | Lewis | G06K 9/00771 |
| | | | 382/128 |
| 2014/0279290 A1* | 9/2014 | Rimnac | G06Q 10/087 |
| | | | 705/28 |
| 2014/0316824 A1* | 10/2014 | Tkatch | G06Q 40/08 |
| | | | 705/4 |
| 2015/0019391 A1* | 1/2015 | Kumar | G07G 1/0036 |
| | | | 705/28 |

OTHER PUBLICATIONS

Written Opinion of the International Searching Authority dated Aug. 7, 2015 for PCT/U52015/029924.

European Patent Application No. 15 789 700.0 Response to Written Opinion.

* cited by examiner

INSTRUMENT INVENTORY SYSTEM AND METHODS

CROSS-REFERENCE TO RELATED APPLICATION

This application claims priority to U.S. Provisional Patent Application No. 61/990,273 filed May 8, 2014. This prior application is incorporated herein by reference.

BACKGROUND

There are applications that use a variety of tools and instruments. These applications include hospital surgery and dental applications. Health care organizations need to maintain records of the type, use and location of the tools and instruments. Other information that may be important in various applications includes provenance, owner and tool maintenance history.

Inventory creation and control is time-consuming and prone to errors when done by human operators. In medical applications, error can be costly in financial outcomes and with regard to patient safety. In addition, in medical applications, reduction of human handling of tools and instruments is desirable for safety and sterilization reasons.

It may be desirable to create an inventory record of a hospital's entire instrument supply or a large portion thereof. When creating an inventory record, groups of instruments are temporarily removed from circulation and the elements in each groups is recorded. The elements are typically surgical instruments and devices. Recording the elements of each group typically involves identifying the instrument type and manually entering the type data into a database or spreadsheet.

A hospital instrument inventory is a time consuming and expensive enterprise. A hospital's instrument supply may range from tens to hundreds of thousands of instruments. A technician skilled in instrument identification is needed to distinguish between the different types.

Typical errors in creating a hospital inventory are instrument misidentification, misspelling of instrument names and miscounting of elements in the groups.

A typical circumstance where an inventory record may be desired is when a hospital chooses to undertake Individual Part Marking (IPM). In IPM, each instrument is given a unique identification number by marking with a barcode, or Radio Frequency Identification tag (RFID). The ID number or RFID tag is typically linked to an instrument type in a database.

Using current methods, the process of creating an IPM database is largely manual. The user scans the barcode and visually identifies the instrument type. The instrument type is then manually entered into a spreadsheet or database.

In another methodology, less skilled labor may be used if the user manually enters the instrument's Vendor Identification number (Vendor ID) into the database. Based on the Vendor ID, a computer system can then determine the instrument type and manufacturer. This methodology has prevalent legibility problems, however, as the Vendor ID generally is etched onto the instrument in a small font, on a typically shiny and hard-to-read surface, and may be worn away by use.

Another instance when the elements of a group of instrumentation are recorded is instrument tray assembly. Instrument tray assembly is the process of verifying that the elements of a tray of surgical instruments match a prescribed list and arranging those elements in a prescribed fashion. The prescribed list is typically referred to as a Count Sheet, Recipe, or equivalent. Instruments are also inspected for cleanliness and functionality during the course of instrument tray assembly.

The elements of an instrument tray prior to assembly are often disorganized. In comparison to the count sheet, there may be excess, incorrect, or insufficient instrumentation. To begin, the elements are typically transferred to a stainless steel work surface. From there the instrumentation is separated into similar categories, and in the case of multiples of a type, further separated by type. Instruments are counted and marked on a physical piece of paper or on a computer software user interface to indicate quantity.

Looped instruments are typically placed onto a stringer in a prescribed order. Generally, the order is determined by the order in which they are listed on the count sheet. A stringer is typically a stainless steel rod bent into a "U" shape. The arms of the stringer are then run through the loops of the instruments.

Set assembly is a time consuming, error prone process often resulting in incomplete or inaccurate sets. Due to the time consuming nature of set assembly, inspection is often overlooked, leading to deficient instrument quality. Instrumentation problems lead to operating room delays, impacting patient health and a hospital's financial outcome.

It remains desirable to have systems and methods for an improved tool and instrument inventory system.

SUMMARY

Embodiments of the present invention is directed to systems and methods for an instrument inventory system.

Embodiments of the instrument inventory system create, record and enable access of data about collections of instruments and tools such as surgical instruments and dental instruments. The instrument inventory system includes at least one user interface, at least one instrument interface, an instrument processor and a database storing instrument records. The instrument inventory system includes a training function which enables the system to create a data record for new instruments when the system encounters new instruments.

The instrument interfaces include identification readers that are able to read instrument identifications including labels and electronic tags, a physical data interface that is able to identify the instrument through physical movement of the instrument, and a visual instrument identification system. In some embodiments, the instrument system receives sensor data. In some embodiments, the instrument system also receives user entered data. The instrument processor analyzes the data associated with an instrument being processed and the instrument system adds to instrument data in the database.

The present invention together with the above and other advantages may best be understood from the following detailed description of the embodiments of the invention illustrated in the drawings, wherein:

DRAWINGS

Figure 6A:
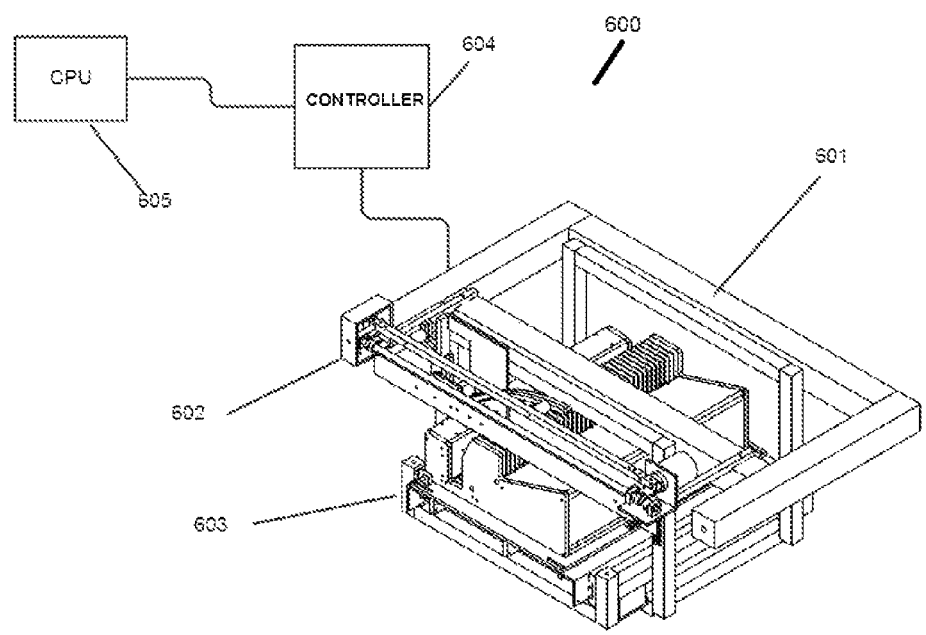
FIG. 6A is a perspective view of a looped instrument collator with a block diagram of an operating system of the looped instrument collator according to principles of the invention.
Figure 21:
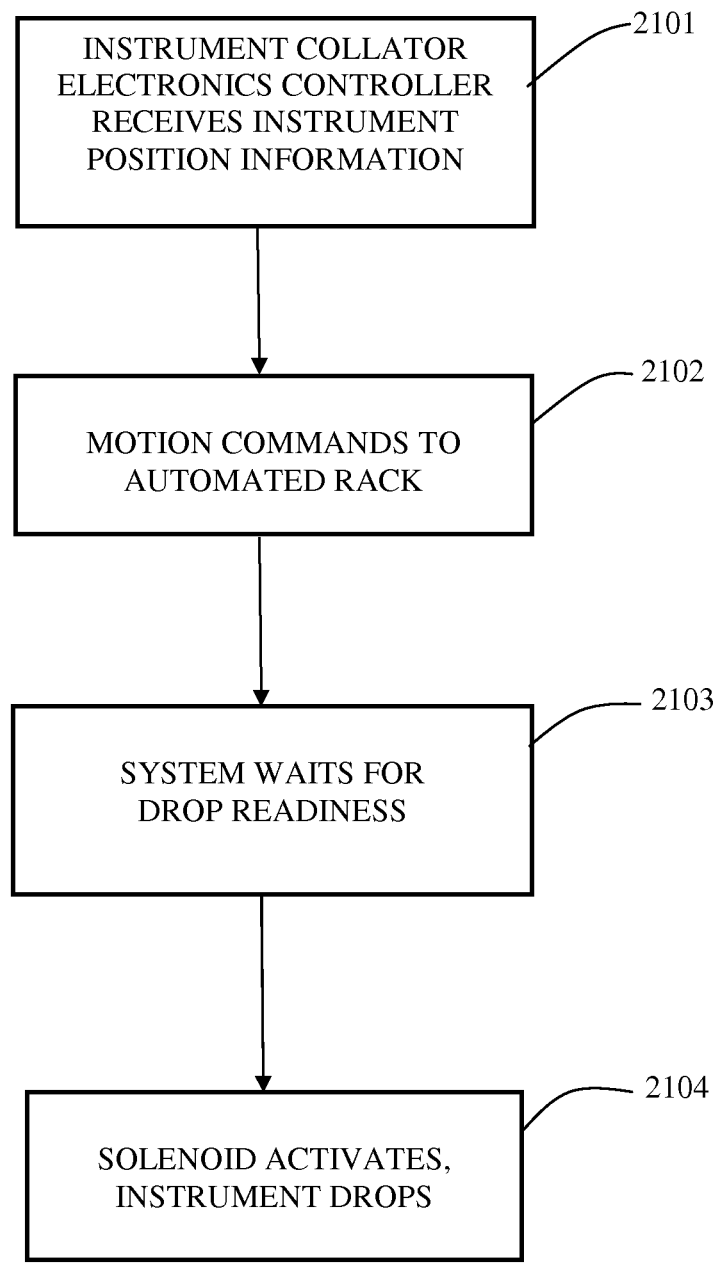
Figure 22:
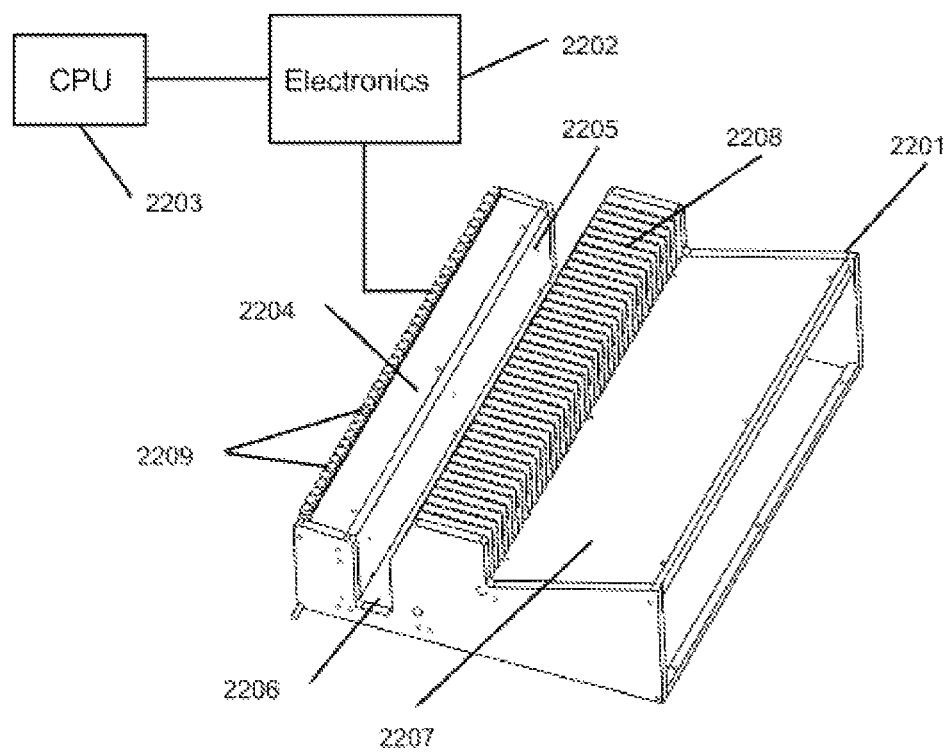
Figure 23:
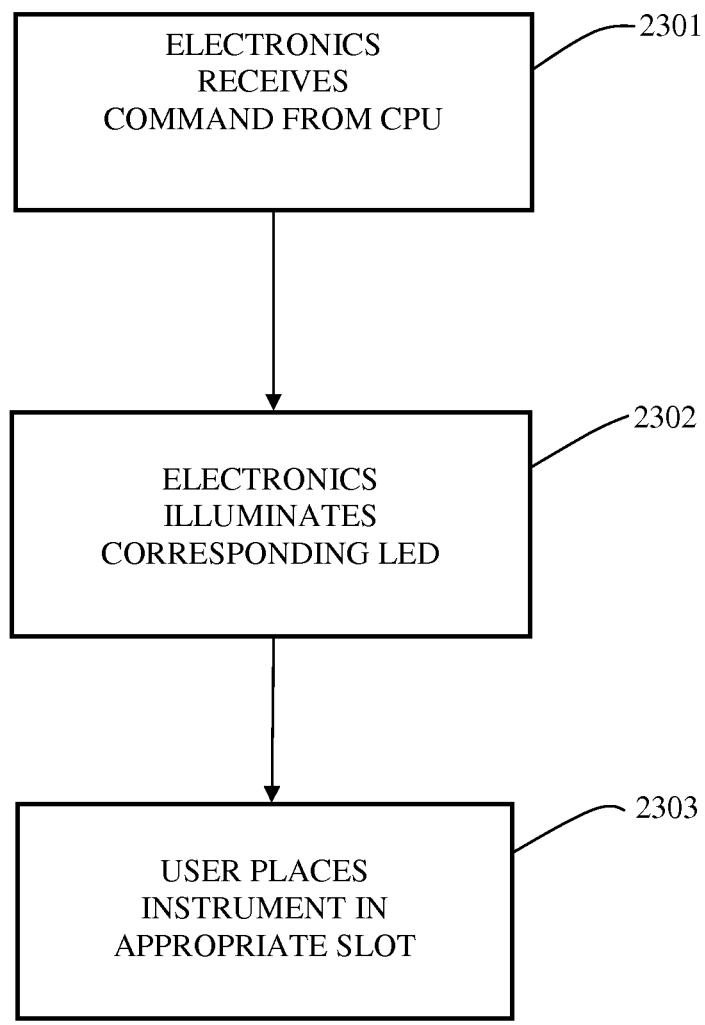
Figure 24:
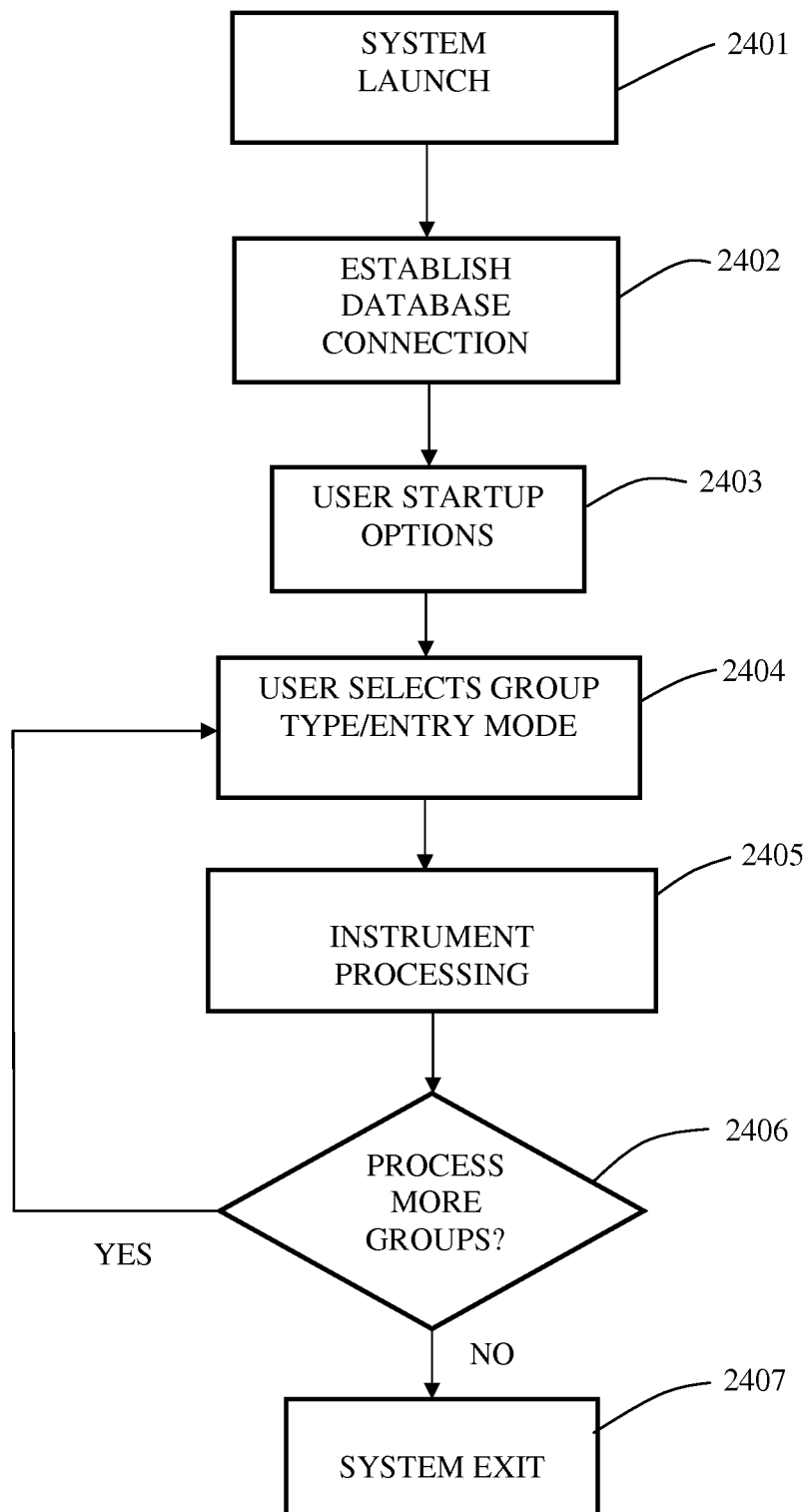
Figure 25:
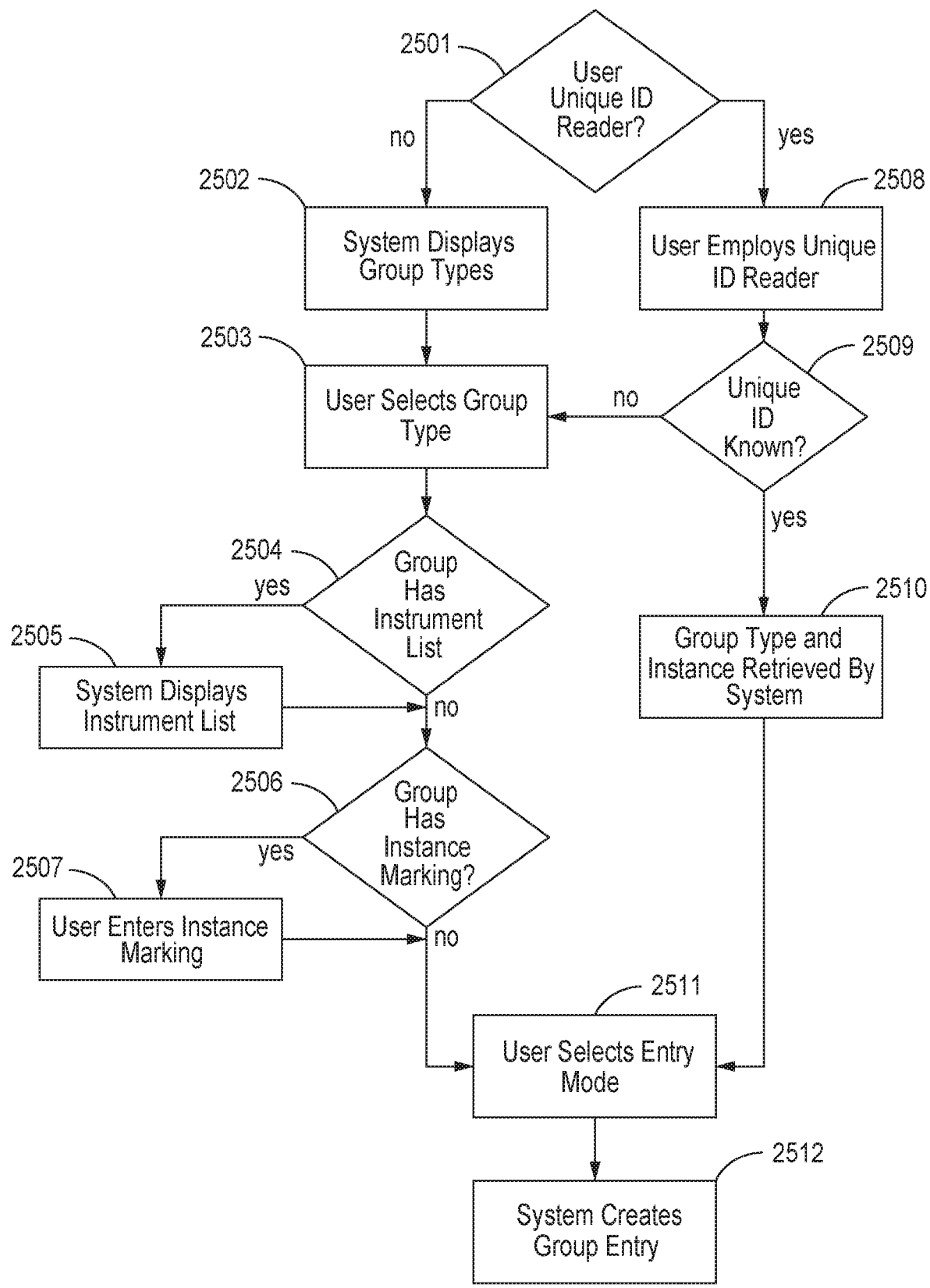
Figure 26:
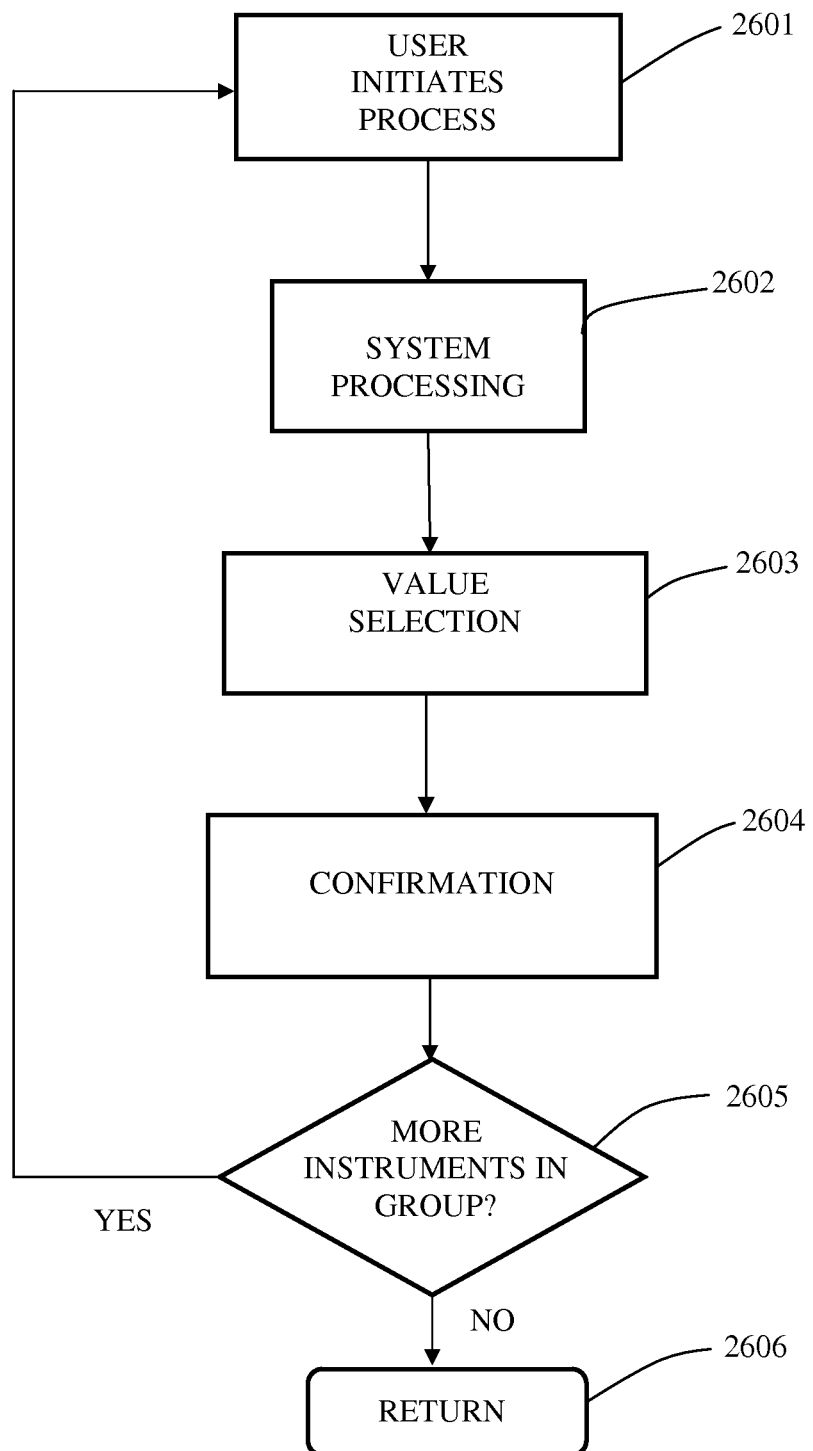
Figure 27A:
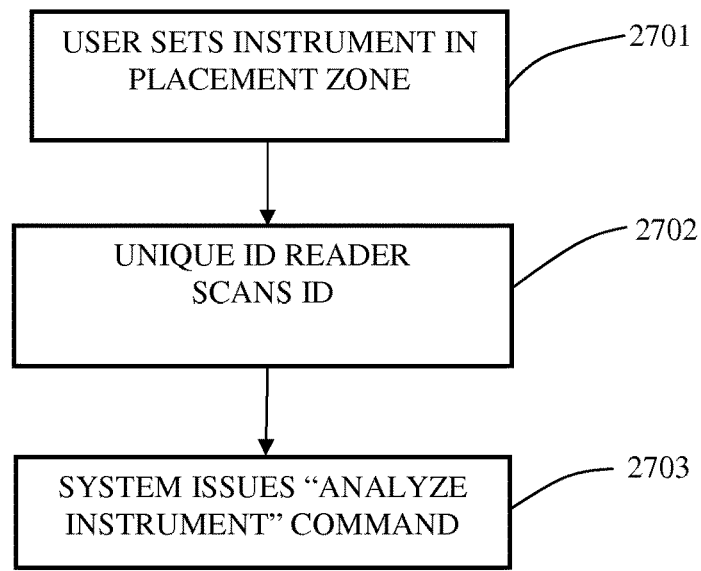
Figure 27B:
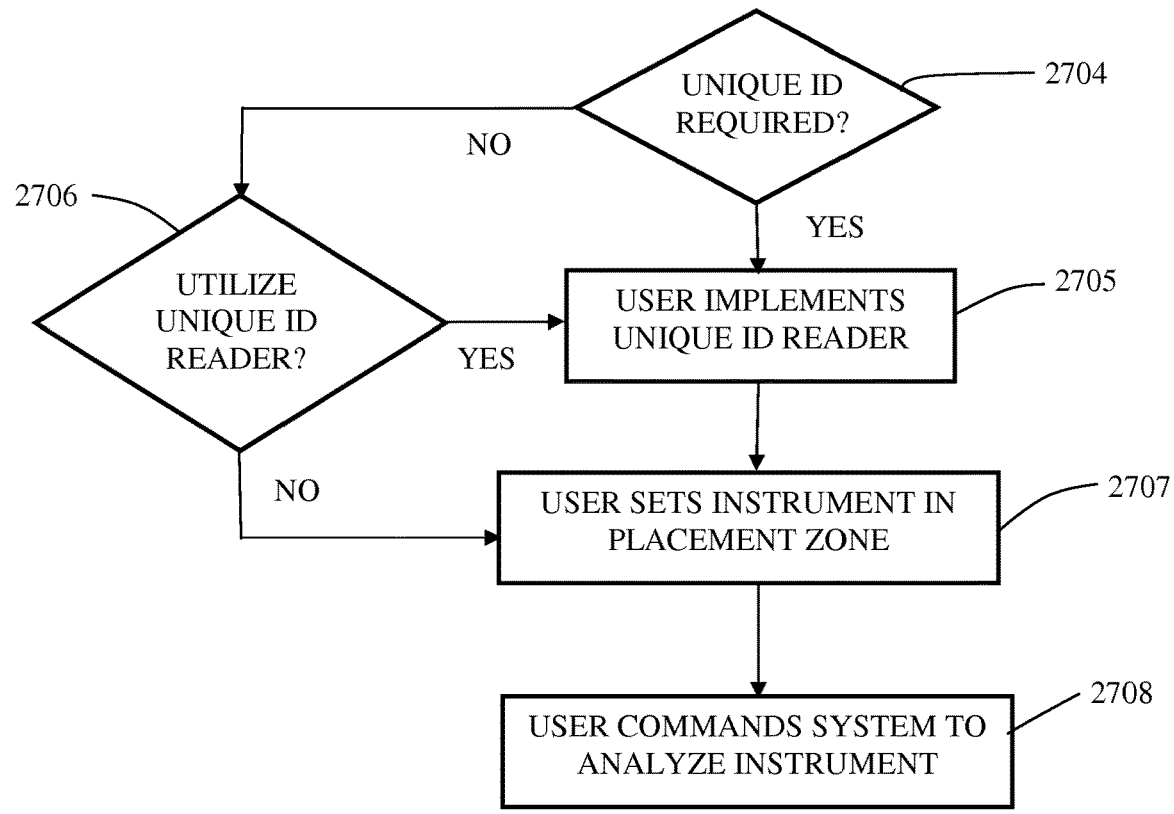
Figure 28:
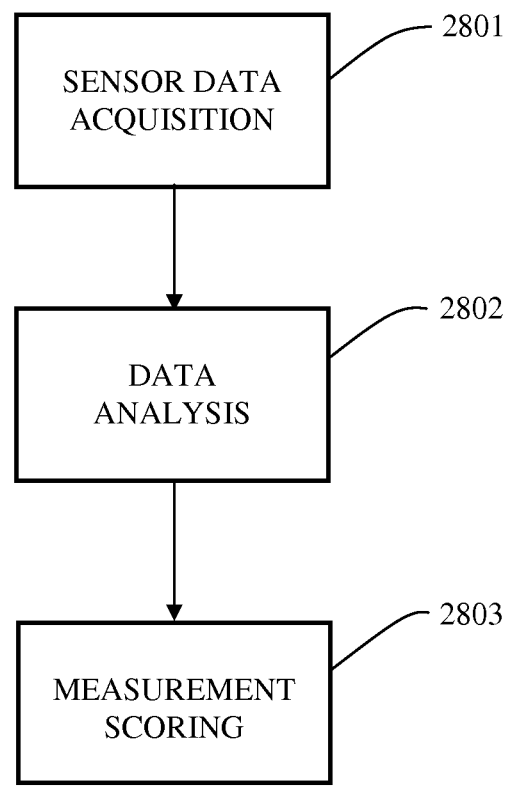
Figure 29:
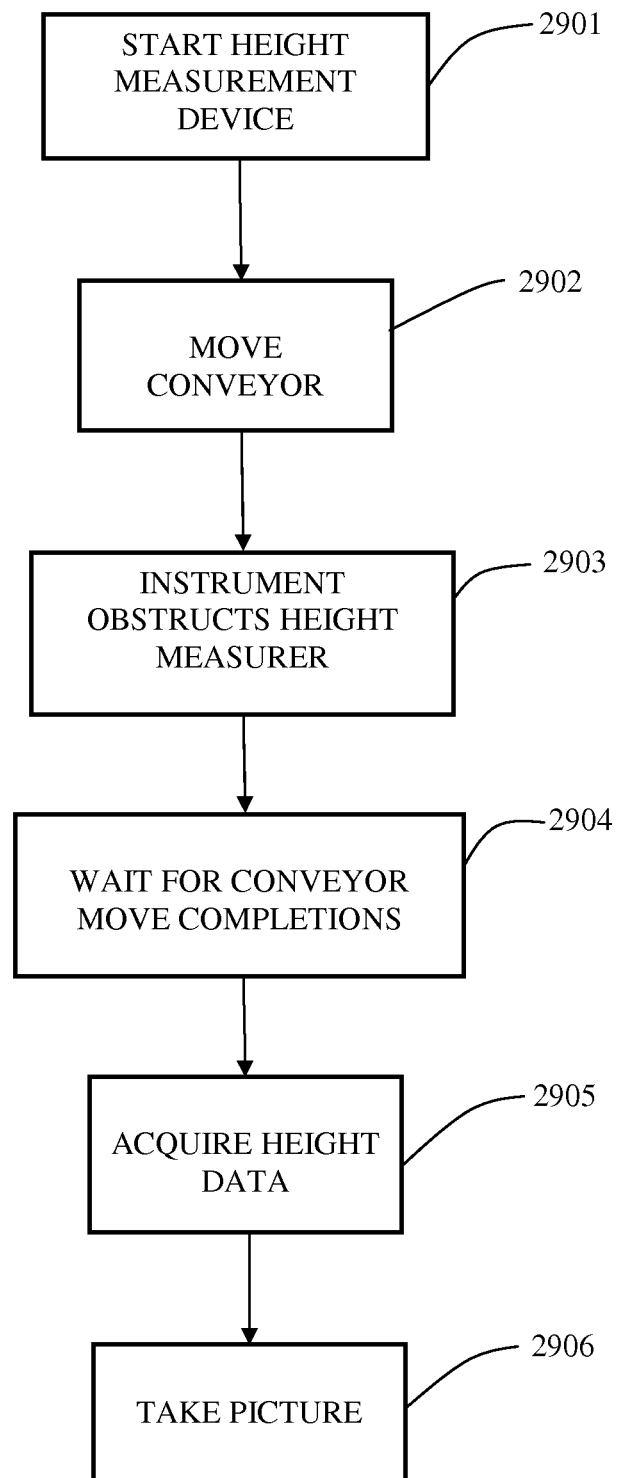
Figure 30:
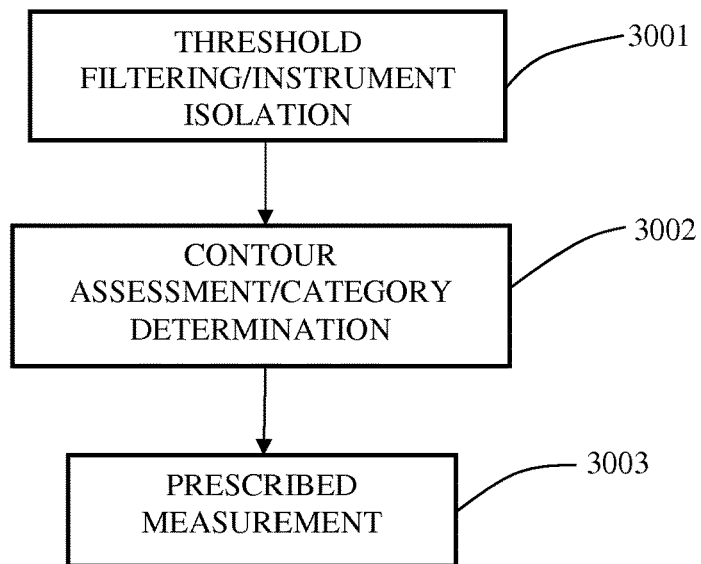
Figure 31:
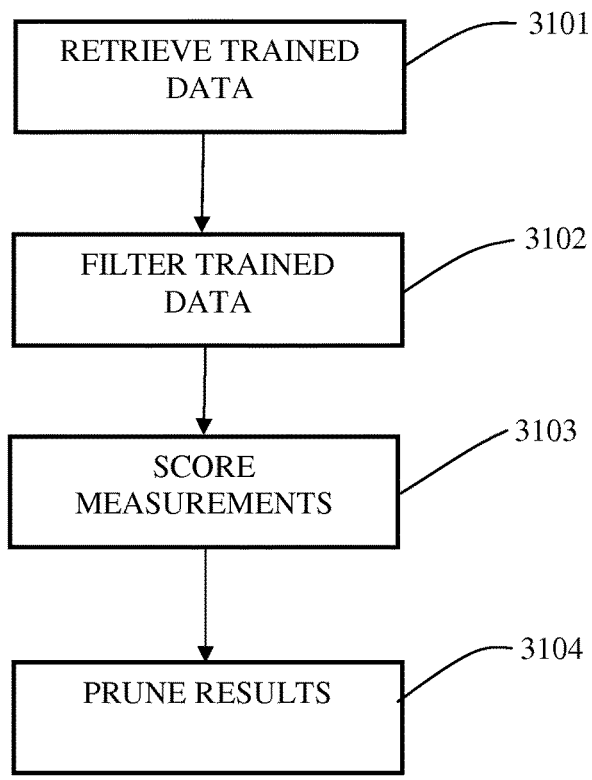
Figure 32:
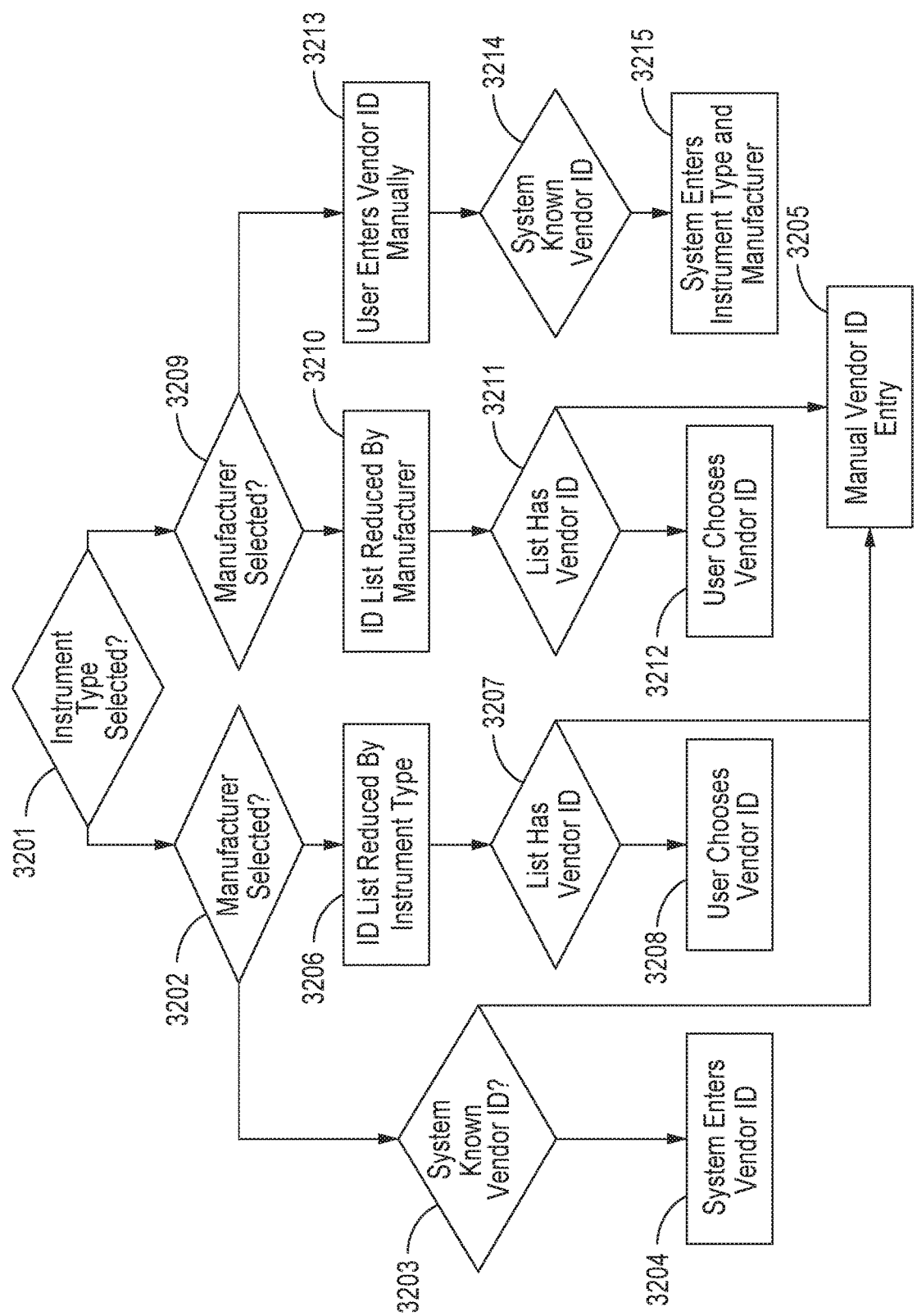
Figure 33:
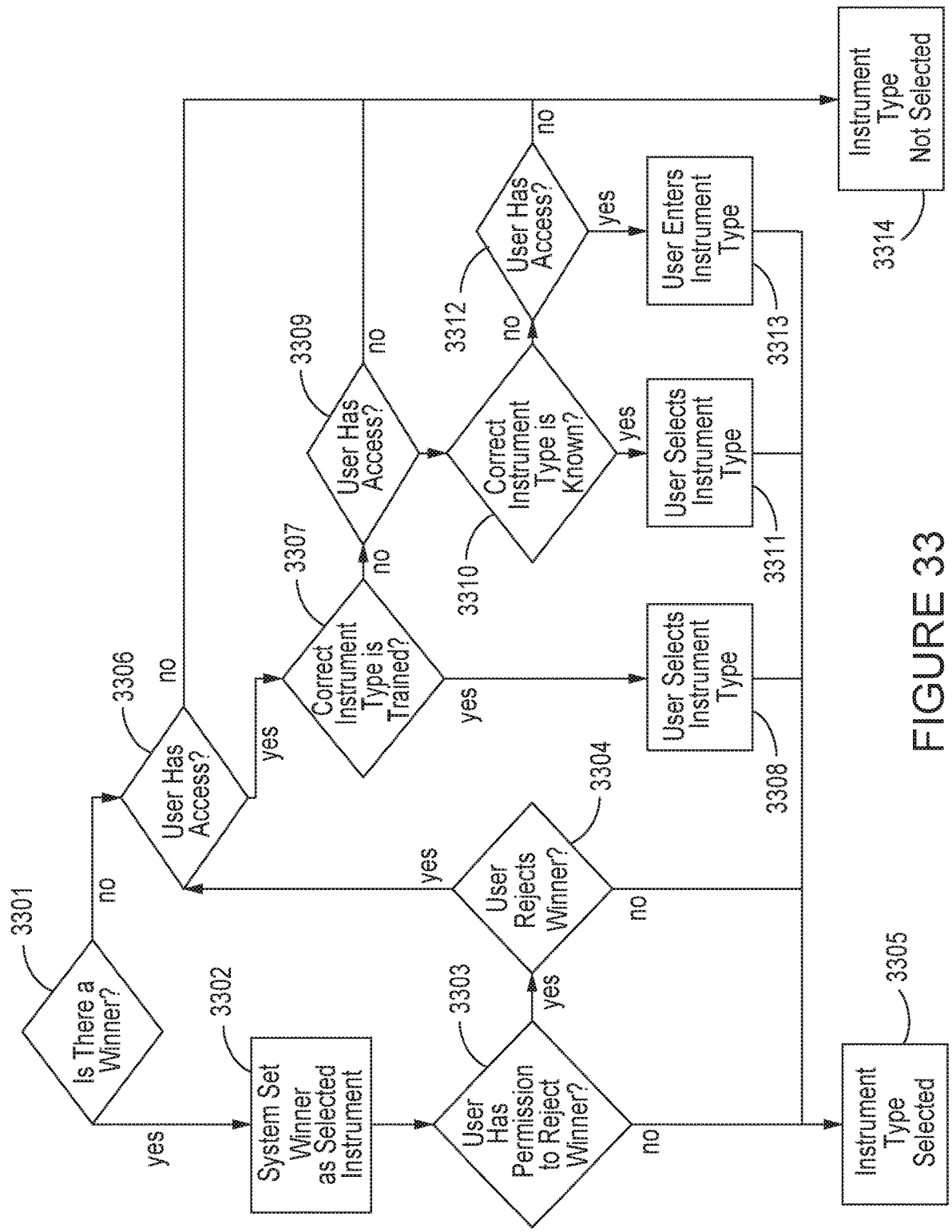
Figure 34:
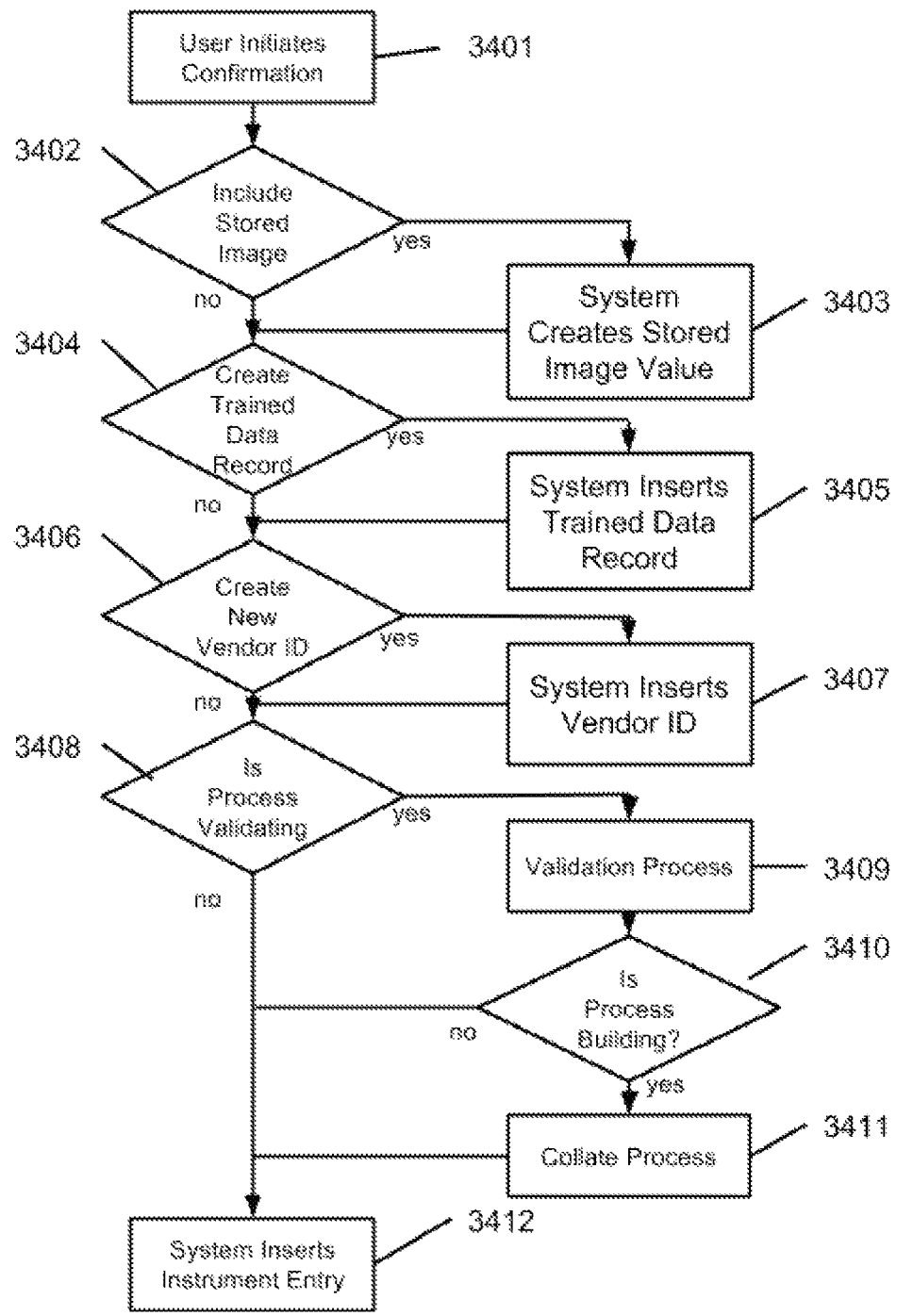
Figure 35:
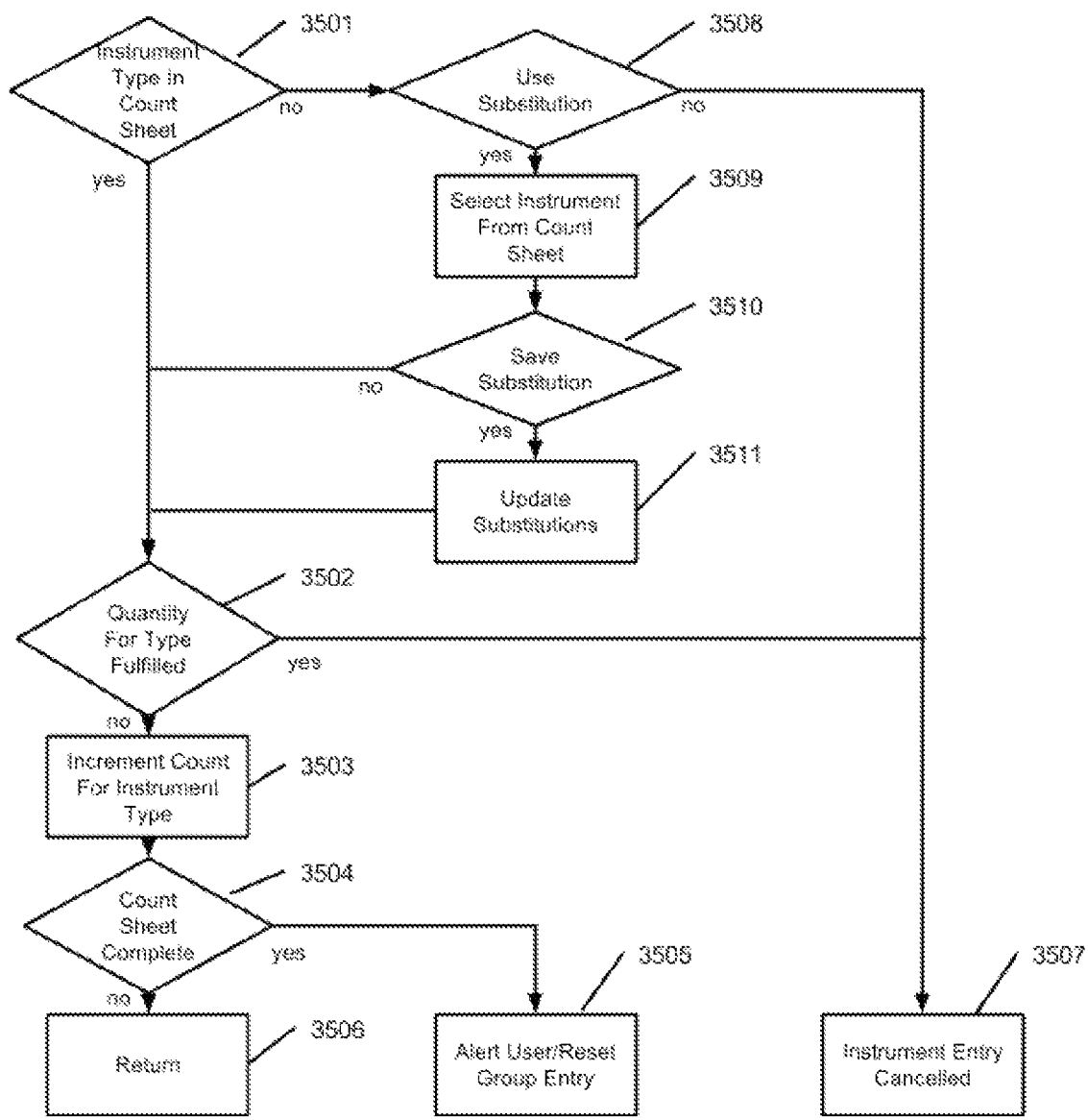
Figure 36:
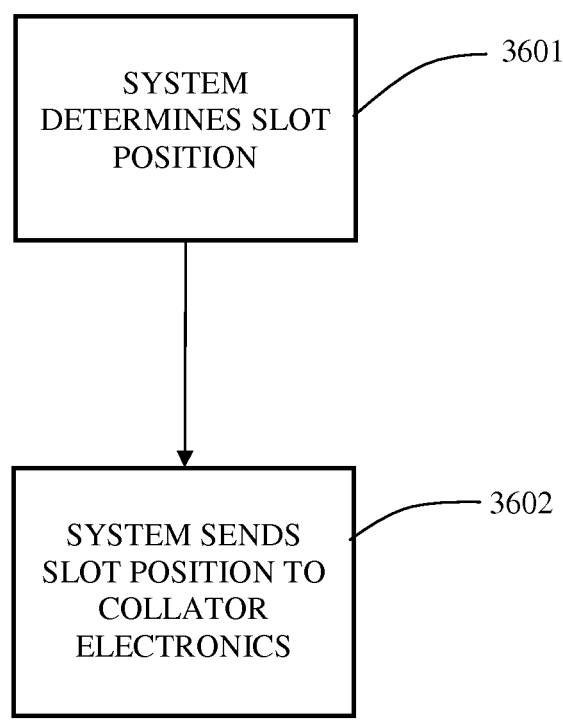
Figure 37:
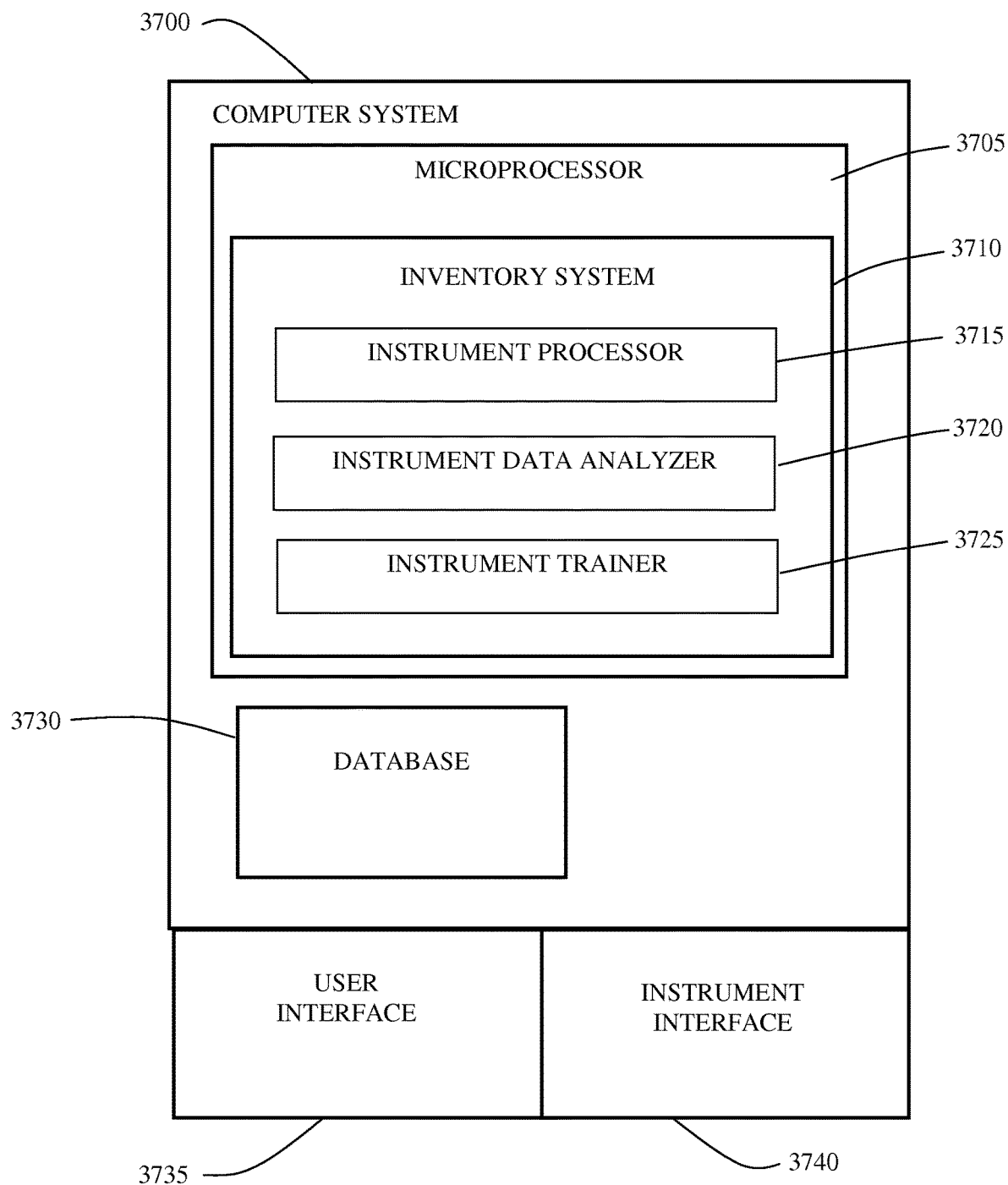

FIG. 21 a flow chart of the operation of an instrument collator of FIG. 6A;

FIG. 22 is a perspective view of a second embodiment of a looped instrument collator including a block diagram of the operating system of the looped instrument collator;

FIG. 23 is a flow chart of the operation of the looped instrument collator of FIG. 22;

FIG. 24 is a flow chart of the operation of the instrument inventory system according to principles of the invention;

FIG. 25 is a flow chart of the group type and entry mode selection subprocess of the instrument inventory system process of FIG. 24;

FIG. 26 is a flow chart of the method of instrument processing by the inventory system according to principles of the invention;

FIG. 27A is a flow chart of a first embodiment of a user initiation process according to principles of the invention;

FIG. 27B is a flow chart of a second embodiment of a user initiation process according to principles of the invention;

FIG. 28 a flow chart of a system processes instrument step according to principles of the invention;

FIG. 29 is a flow chart of a sensor data acquisition process according to principles of the invention;

FIG. 30 is a flow chart of the data analysis process according to principles of the inventions;

FIG. 31 is a flow chart of the data scoring step according to principles of the invention;

FIG. 32 is a flow chart of a value selection process according to principles of the invention;

FIG. 33 is an expanded flow chart of the instrument type selection process of FIG. 26;

FIG. 34 is a flow chart of the confirmation process according to principles of the invention;

FIG. 35 is a flow chart of the validation process according to principles of the invention;

FIG. 36 is a flow chart of the collation process according to principles of the invention; and FIG. 37 is a block diagram of computer implemented inventory system according to principles of the invention.

DESCRIPTION

Embodiments of the instrument inventory system create, record and enable access of data about collections of instruments and tools such as surgical instruments and dental instruments. The instrument inventory system includes at least one user interface, at least one instrument interface, an instrument processor and a database storing instrument records.

Figure 1:
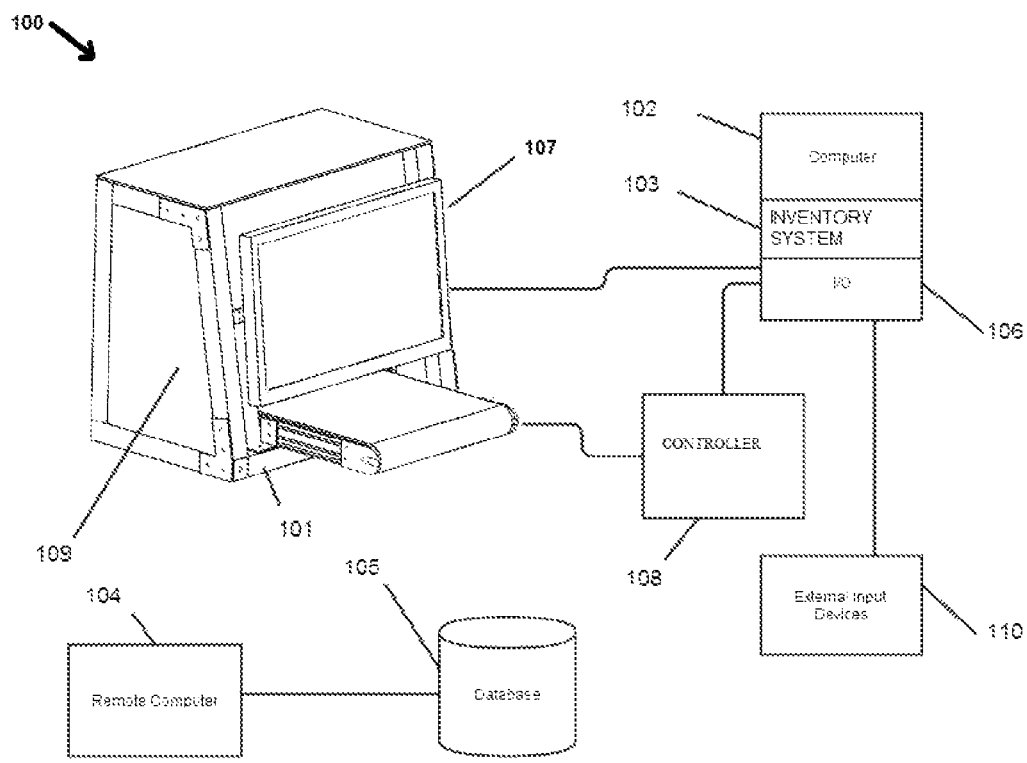
FIG. 1 is a diagram a computer environment in which an instrument inventory system operates in accordance with one embodiment of the present invention.

FIG. 1 is a diagram of a computer environment 100 in which an instrument inventory system operates according to one embodiment. The computer environment includes a local computer including a hardware processor 102, an inventory system 103 and an interface for input and output ("I/O interface") 106. The I/O interface 106 is in communication with external input devices 110. The computer environment 100 further includes an instrument imaging device 109 having a body 101, a monitor/touch screen 107 and a hardware controller 108. The I/O interface 106 is in communication also with the hardware controller 108 of the instrument imaging device. The computing environment 100 further includes a remote computer 104 and a database 105.

The instrument inventory system 103 of the present embodiment creates, records and accesses surgical instrument data. The instrument imaging device 109 includes the body 101 that provides an outer structure for the instrument imaging device 109 as well as attachment points for various components of the instrument inventory system. In the present embodiment, the local computer 102 is in communication with the remote computer system 104 operating a centralized database 105. In an alternative embodiment of the inventory system, the contents of the database 105 are replicated and accessed on the local computer 102.

The local computer 102 additionally enables communication with peripheral electronic devices via the computer's I/O ports 106. A monitor or touch screen 107 is used for information display and user entry for the instrument imaging device 109. The hardware controller 108 controls the instrument imaging device 109. The instrument imaging device 109 produces image and other data related to the analysis of surgical instruments. The local computer 102 executing the inventory system 103 may make use of one or more external input devices 110. The one or more external input devices 110 are peripheral components used for data input. Example external input devices include a keyboard, a mouse, a unique identification reader such as an RFID or barcode scanner, a camera, and a microphone. The list of external input devices is merely exemplary. Other types of external input devices are possible within the scope of the invention. The external input device 110 is, in a first embodiment, mounted rigidly to the body 101. In an alternative embodiment, the external input device 110 is tethered to the body 101 such that it is a handheld device. The external input device 110 may be user operated, or may be controlled by the system software. The inventory system 103 may use a single external input device 110 or a combination of external input devices 110.

The operation of the instrument inventory system 103 is described below with regard to FIG. 24.

Figures 2A, 2B:
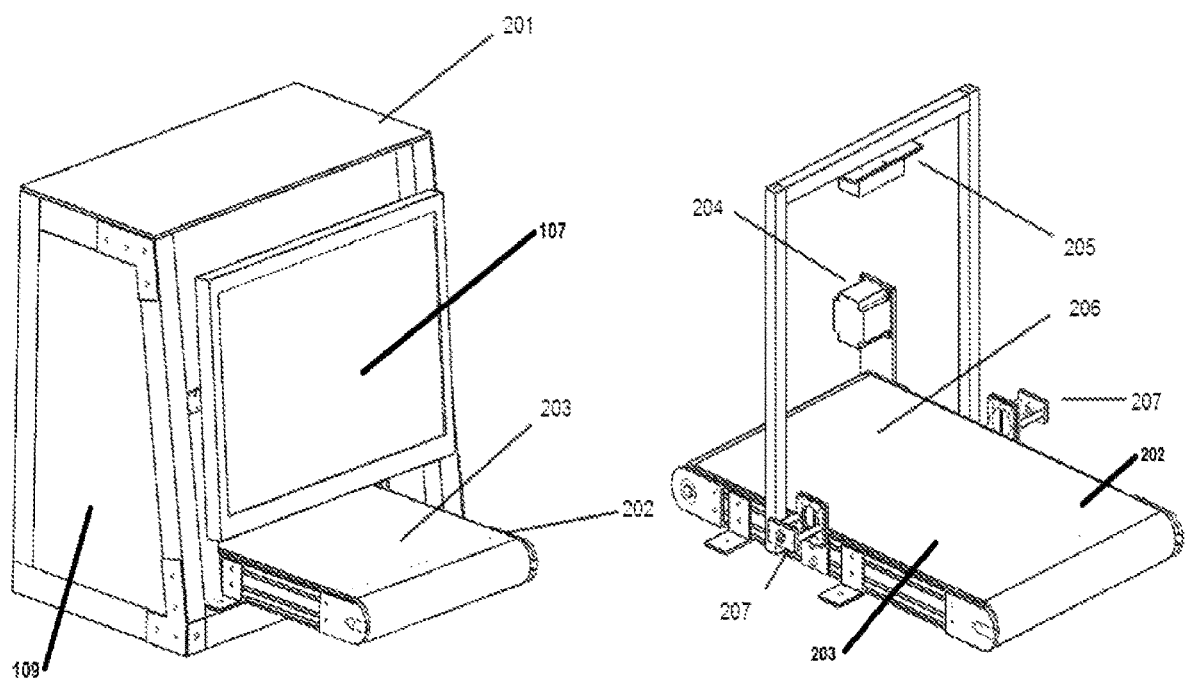
FIG. 2A is a perspective view of an embodiment of an instrument imaging device according to principles of the invention.
FIG. 2B is a perspective view of an embodiment of inner elements of the instrument imaging device of FIG. 2A.

FIG. 2A is a perspective view of an embodiment of the instrument imaging device 109 and FIG. 2B is a perspective view of an embodiment of inner elements of the instrument imaging device 109. In FIG. 2A, the instrument imaging device 109 has a cover 201 and a touch screen 107. In FIG. 2B, the instrument imaging device 109 is shown with the cover 201 and the touch screen 107 removed. The space enclosed within the cover 201 (also referred to as the "hood") is referred to as the vision cell. The instrument imaging device 109 uses a conveyor belt 202 to transport instruments from outside of the vision cell to inside the vision cell. Other embodiments may use a rotary index table or any other such device for transporting the instruments. In operation, instruments or tools to be inventoried are set down on the instrument placement zone 203 on the conveyor belt 202. A motor 204 is connected to the conveyor belt 202 through a drive mechanism (not shown in this view). One embodiment of the instrument imaging device 109 uses a stepper motor with a drive mechanism consisting of timing pulleys and a timing belt, but other types of motors and drive mechanisms may be used in other embodiments. The present system is not considered limited by the type of motor driving the instrument conveyor system.

A camera 205 for capturing images of the instruments to be inventoried is located above a viewing area 206. A height measurement device 207 is located between the instrument placement zone 203 and the viewing area 206.

Database

The instrument inventory system 103 includes systems and methods for creating, storing and accessing data to surgical instruments. The data is stored in a relational database. In some embodiments, the relational database is for example, the MySQL relational database of Oracle Corporation of Redwood City, Calif. Other relational databases may be used in alternative embodiments.

Figure 3:
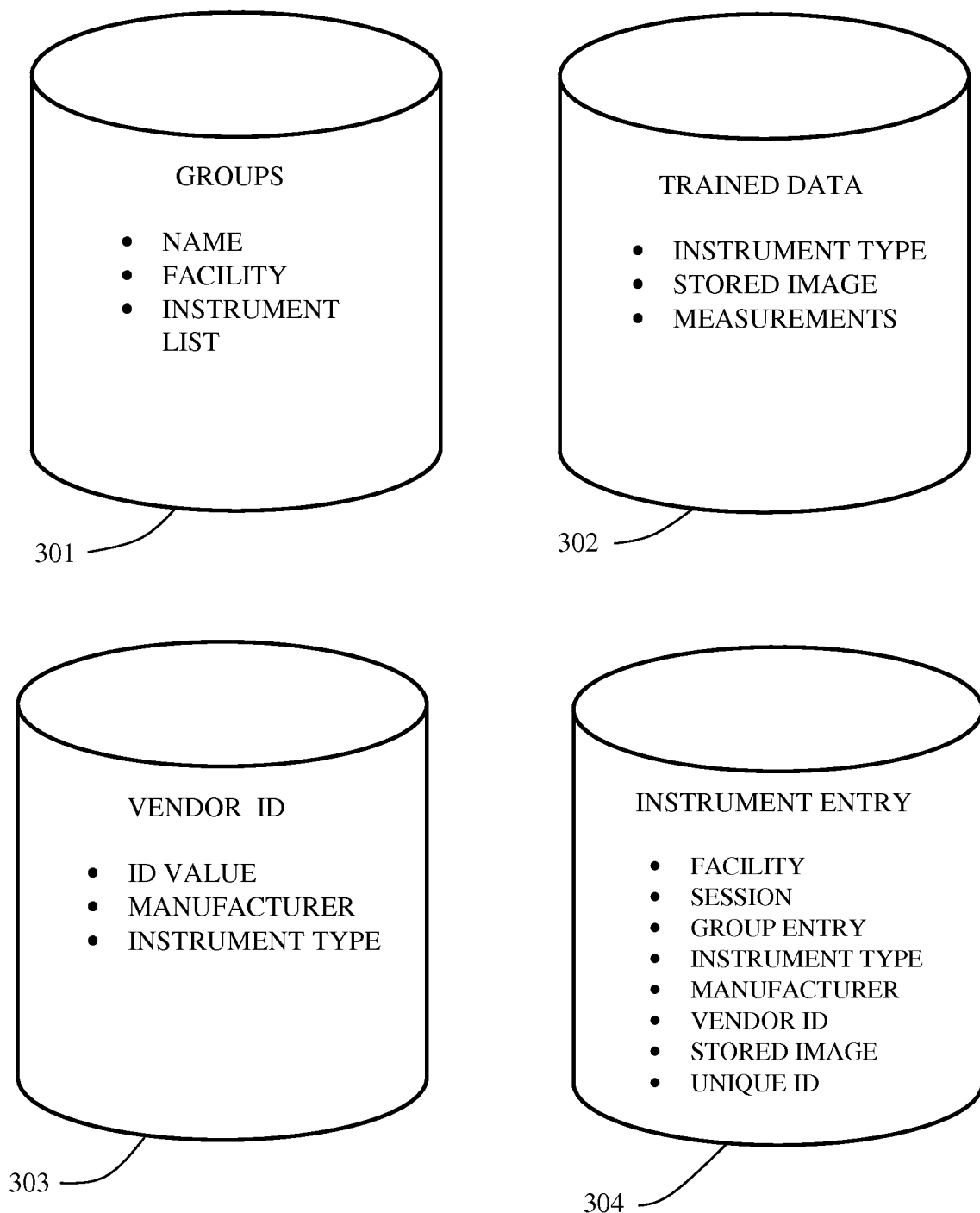
FIG. 3 is a block diagram of a relational database suitable for use in embodiments of the present invention.

FIG. 3 is a block diagram of an exemplary database tables which may be used by embodiments of the inventory system 100. The database tables are a group table 301, a trained data table 302, a vendor identification table 303 and an instrument entries table 304.

The group table 301 holds information related to different types of groups. Individual instruments are typically found in the context of a group of instruments. A group may be, but is not limited to, a tray or set, a storage container, or simply a loose group of instruments with no particular association. The group table 301 stores information pertaining to different group types. The group table 301 may have columns for a group name, a facility, and an instrument list for the group. An instrument list is typically a list of instrument types and quantities for each type. An instrument list is also referred to as a count sheet, recipe, inventory list or equivalent.

The trained data table 302 holds information related to surgical instrument identification. The inventory system 100 uses machine vision software to analyze images of surgical instruments. The processes related to the trained data table 302 will be described in greater detail below with regard to FIG. 29 and FIG. 30. Measurements are produced from an analysis of images created by the instrument imaging device 109. Those measurements are compared to data in the trained data table 302 to determine the instrument type. Additionally, these measurements can be entered into the trained data table 302 as a trained data record. Trained data records have fields for the instrument type, stored image, and measurements.

The vendor identification table 303 holds records relating a particular manufacturer's instrument type to an identification value. Surgical instruments are commonly marked with a manufacturer or vendor identification. A particular vendor will have an identification value specific to one instrument type. Conversely, an instrument's vendor identification will typically correspond to only one combination of instrument type and manufacturer. This relationship is stored in the vendor identification table 303. Vendor identification records have fields for identification value, manufacturer, and instrument type.

The instrument entries table 304 holds instance specific instrument data. A processed instance of a surgical instrument is referred to as an instrument entry. In some embodiments, instrument entries are stored in an instrument entry table 304. Shown in FIG. 3 are the various fields which hold the values for the different aspects of an instrument entry. In one embodiment, the values are directly held in the fields. In other embodiments, each field holds a pointer to a record in another table with corresponding data. Further alternative embodiments may use a combination of values and pointer for the different fields.

The facility field in table 304 holds a value which represents a location where the instrument entry was created. The location may be a hospital or any other facility where instrument processing occurs. In some embodiments, the facility field value is a pointer to a record in a facilities table. The fields of a facility record may include facility name and facility related information.

The session field in table 304 holds a value which represents a period of use of the system. In some embodiments, the session field value is a pointer to a record in a sessions table. Fields of a session record may include the date and time of commencement, a user identification, and a facility.

The group entry field in table 304 holds a value which represents a particular processed instance of a group. In some embodiments, the group entry field value is a pointer to a record in a group entry table. The fields of a group entry record may include a group name, a time and date the group began processing, and a unique identifier for the particular group.

The instrument field in table 304 holds a value which represents the instrument type. In some embodiments, the instrument field value is a pointer to a record in an instrument type table. An instrument type record will typically have fields for an instrument name, length, and category.

The manufacturer field in table 304 holds a value which represents the manufacturer or vendor of the instrument. In the present application, the terms manufacturer and vendor are equivalent and are used interchangeably. In some embodiments, the manufacturer field value is a pointer to a record in a manufacturers table. A manufacturer record will typically have fields for a manufacturer's name.

The vendor identification field of table 304 holds a value which represents the vendor identification of the instrument. The vendor identification is a particular vendor's part number for an instrument type. In some embodiments, the vendor identification field value is a pointer to a record in the vendor identification table 303. The fields of a vendor identification record typically include a vendor identification, a manufacturer, and an instrument type.

The stored image field of table 304 holds a value which represents an image of the instrument. In some embodiments, the stored image field value is a pointer to a record in a stored image table. Typical fields for a stored image record include a picture, a file name and path of a picture, and other data relevant to image creation.

The unique ID field of the table 304 holds a value which represents the unique identification of an instrument. A unique identification is an instance specific identifier such as a barcode or an RFID tag number. In some embodiments, the unique ID field value is a pointer to a record in a unique identification table. A unique identification record will typically have fields for a unique identification number, a facility, and a vendor identification.

Collator

Figure 4:
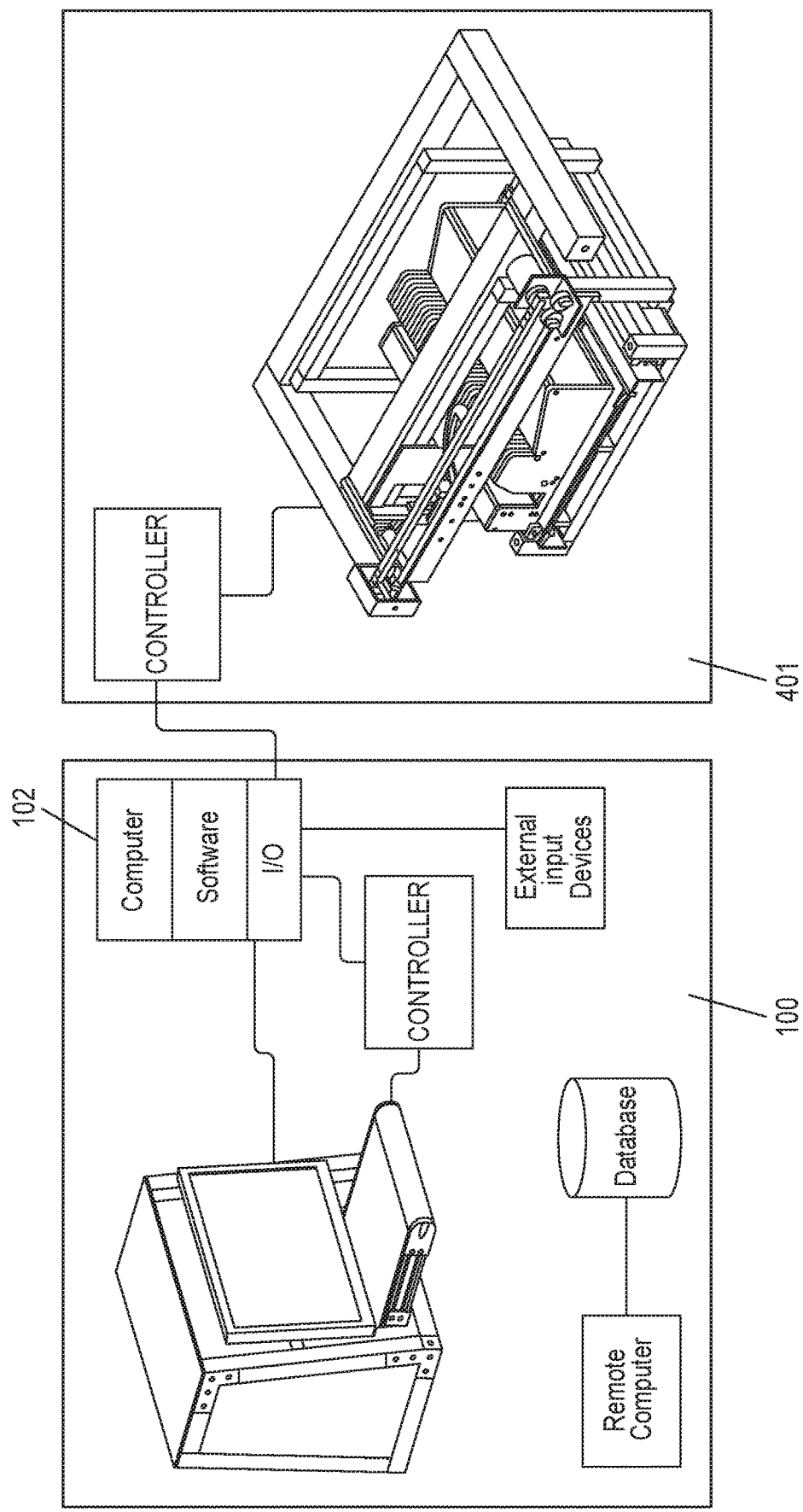
FIG. 4 is a diagram of the embodiment of the system of FIG. 1 further including a looped instrument collator according to principles of the invention.

FIG. 4 is a diagram of the embodiment of the instrument inventory system further including a looped instrument collator 401. The looped instrument collator 401 is a peripheral device, and receives commands from the computer 102. The looped instrument collator 401 is a device for easily positioning substantially randomly encountered looped instruments in the order prescribed by a count sheet. Alternative embodiments of the looped instrument collator maintain the instruments in such an orientation that their loops are generally concentric. This orientation allows for easily sliding the arms of a stringer through the loops of the collated instruments. Further embodiments of the looped instrument collator maintain the instruments in such an orientation as is ideal for washing. This orientation holds the loops substantially further apart then that for stringing.

Figure 5:
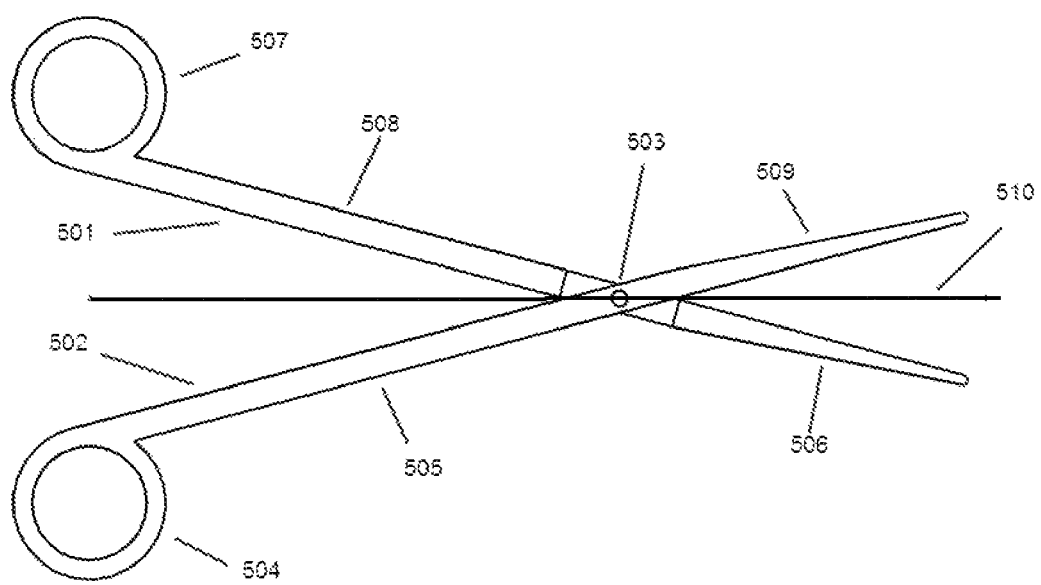
FIG. 5 is a side view of an exemplary looped instrument suitable for use in embodiments of the invention.

FIG. 5 is a side view of an exemplary looped instrument suitable for use in the collator of FIG. 4. For looped instruments with a curved tip, it is assumed for the purposes of the present description, that the tip of the instrument is angled up and vertical to the instrument plane of the page. Looped instruments typically have a left segment 501 and a right segment 502 which are joined at a hinge 503. The right segment 501 includes a right loop 504, a right arm 505, and a right tip 509. The left segment 502 includes a left loop 507, a left arm 508, and a left tip 506. The arm portions of the instrument span the length of the segment from the loop to the hinge. The tip portions of the instrument span the length of the segment from the hinge to the end of the instrument. Roughly bisecting the instrument is a line termed the central axis 510. The central axis intersects the midpoint of a line drawn between the loop centers and the fulcrum of the hinge 503.

Looped Instrument Collator

First Embodiment

FIG. 6A shows a first embodiment of a looped instrument collator 600. The collator 600 includes two electro-mechanical assemblies attached to a body 601. One of the electro-mechanical assemblies is a catch and release mechanism 602. The other electro-mechanical assembly is an automated rack 603. The assemblies 602, 603 are controlled by electronics hardware 604 which receives commands from a CPU 605.

Figure 6B:
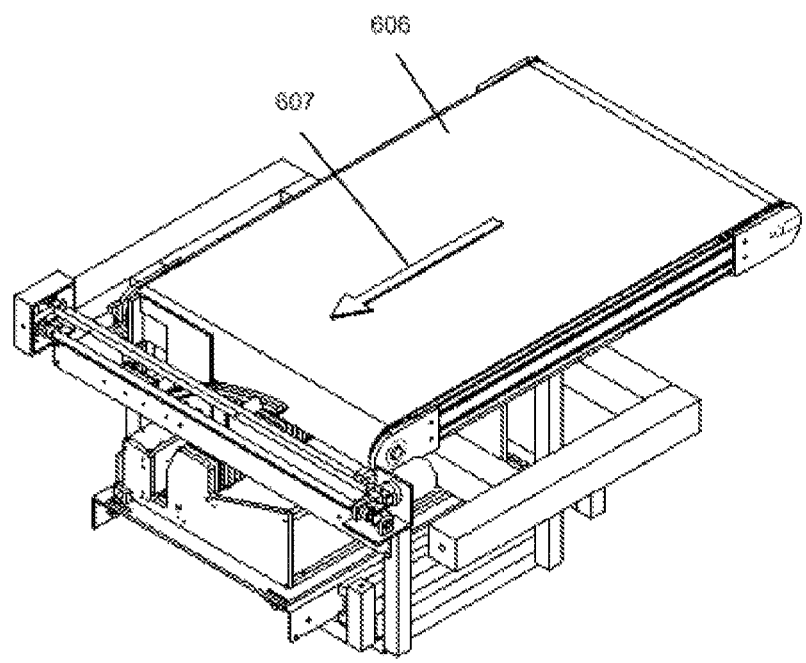
FIG. 6B is a perspective view of an alternative embodiment of a looped instrument collator.

Some embodiments of the looped instrument collator are freestanding as shown in FIG. 6A. In other embodiments, the looped instrument collator is oriented at the end of a conveyor belt as shown in FIG. 6B. The conveyor belt 606 motion is represented by arrow 607. Other ways to load the instruments into the collator are possible.

Catch and Release

Figure 7:
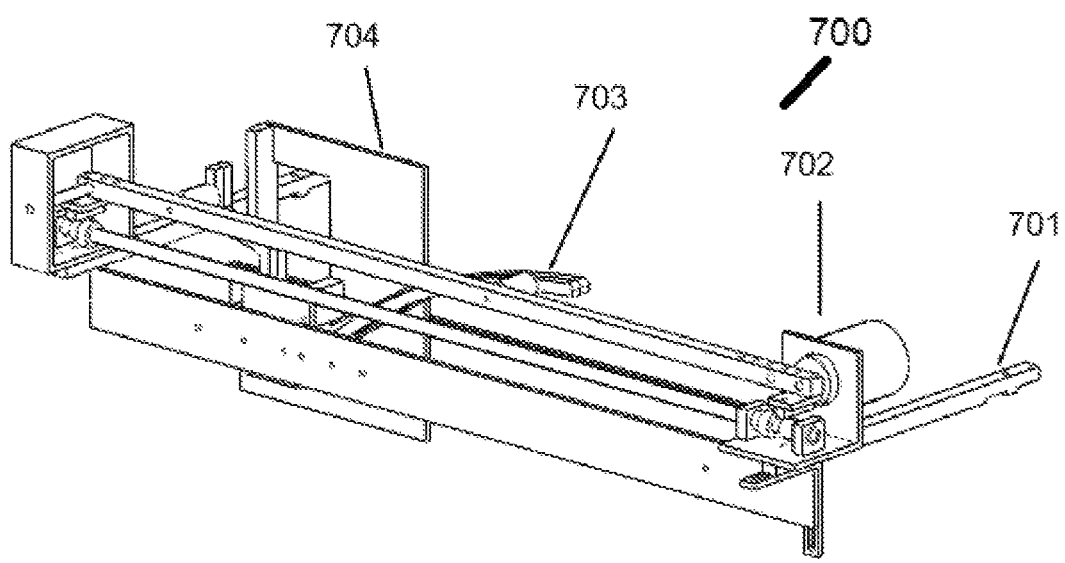
FIG. 7 is a perspective view of a catch and release mechanism for use in embodiments of the looped instrument collator.

FIG. 7 shows one embodiment of a catch and release mechanism 700 for use in embodiments of the looped instrument collator such as those in FIGS. 6A and 6B. The catch and release mechanism has a base 701, a solenoid drive assembly 702, an instrument catch contour 703, and a guide assembly 704.

Figure 8:
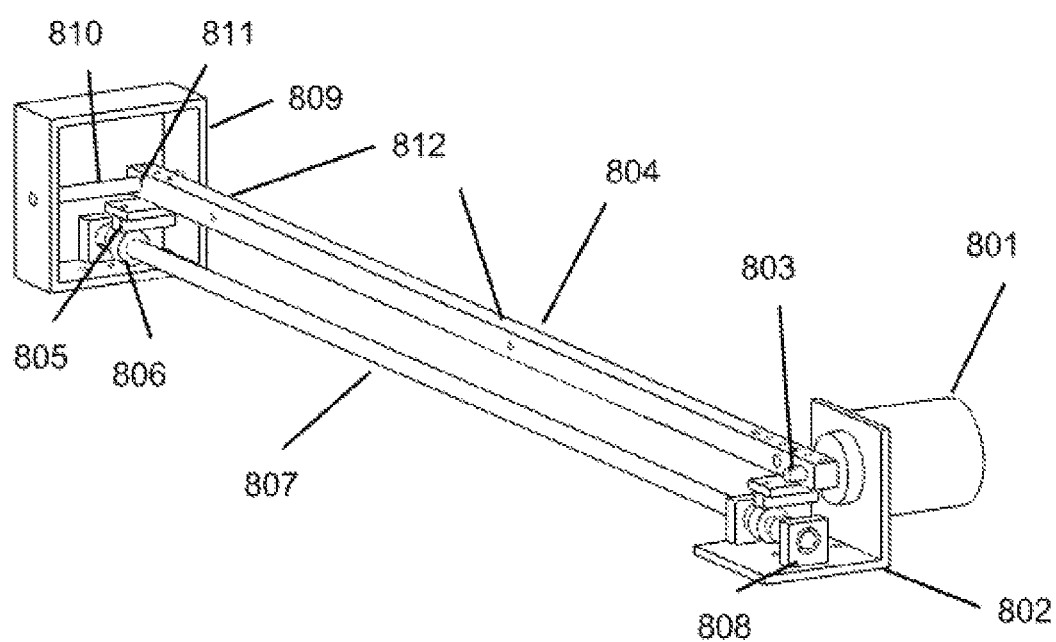
FIG. 8 is a perspective view of a solenoid drive for use in embodiments of the catch and release mechanism.

FIG. 8 shows the solenoid drive assembly 702 from the embodiment of a catch and release mechanism shown in FIG. 7. The present embodiment of the solenoid drive assembly 702 uses a push solenoid 801 to effect linear motion, though it will be understood by those skilled in the art that many electro-mechanical device with a suitable drive assembly may be used to produce the desired linear motion. The push solenoid 801 is attached to the base 701 by the solenoid mount 802, and, in one embodiment, is located on the right side of the solenoid drive assembly 702. In one embodiment, a solenoid rod 803 is attached directly to a cross member 804. Also attached to the cross member 804 are right and left rack assemblies 805. Both rack assemblies 805 have teeth which mesh with corresponding left and right spur gears 806 which are attached to the drive shaft 807. The drive shaft is mounted in pillow blocks 808 which are attached to the solenoid mount 802 and the guide mount 809. Attached to the guide mount 809 is the slide shaft 810, which passes through the cross member 804 at the guide slot 811. Concentric with the guide shaft and placed between the inner wall of the guide mount and the cross member is a return spring (not shown in this figure).

Figure 9:
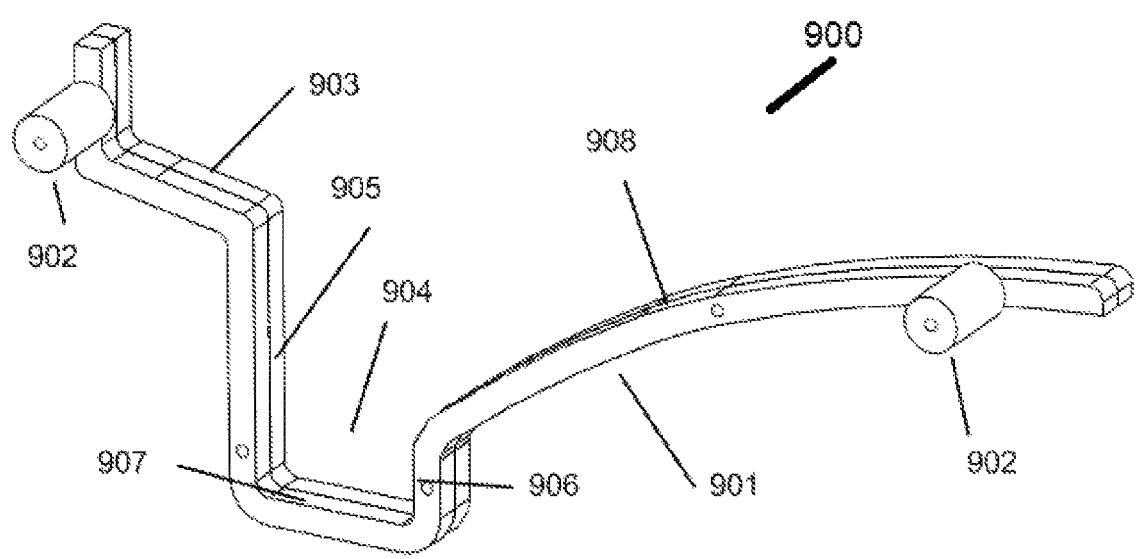
FIG. 9 is a perspective view of an instrument catch contour for use in embodiments of the catch and release mechanism.

FIG. 9 shows an instrument catch contour 900 from the catch and release mechanism of FIG. 7. The instrument catch contour 900 has an instrument catch body 901. Protruding from the instrument catch body 901 are the catch spacers 902 which are attached to the cross member of the solenoid drive using attachment holes 812. The top surface of the instrument catch contour has several functional components. The left loop rest 903 provides a surface for support of the left loop of the instrument. The right loop basin 904 confines the right loop laterally between the loop separation span 905 and the right loop protrusion span 906. The distance between the separation span 905 and the protrusion span 906 is configured to permit the right loop of a large looped instrument to fit in the right loop basin. This distance is, for example, 1⅛". The right loop of the instrument is supported by the right loop rest 907. The tip end of the instrument is supported by the tip rest 908. The thickness of the instrument catch contour is sufficient to allow for proper support of a curved instrument tip when the instrument is on its side. In one embodiment, the contour thickness is, for example, ½", but lesser or greater thicknesses are possible within the scope of the invention. In one embodiment the contour has a varied thickness over its length.

Figure 10:
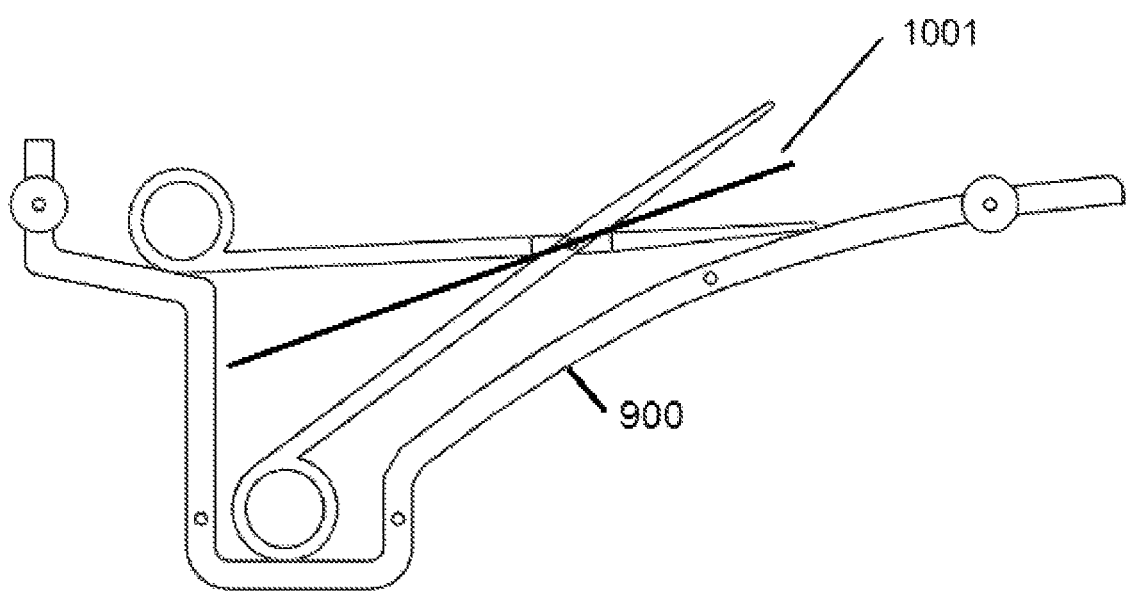
FIG. 10 is a side view of the instrument catch contour of FIG. 9 shown holding a looped instrument such as that shown in FIG. 5.

FIG. 10 shows the instrument catch contour 900 holding an instrument. The tilt angle refers to the measured angle between the horizontal and the central axis 1001 of the loop instrument when held in the instrument catch contour 900. Instrument size and tip shape affect the resting position and tilt angle of a given instrument within the instrument catch.

The combination of the tip rest angle and loop separation height of the upper and lower loop rests results in a tilt angle greater than 0 degrees and preferably between 15 and 30 degrees.

Figure 11:
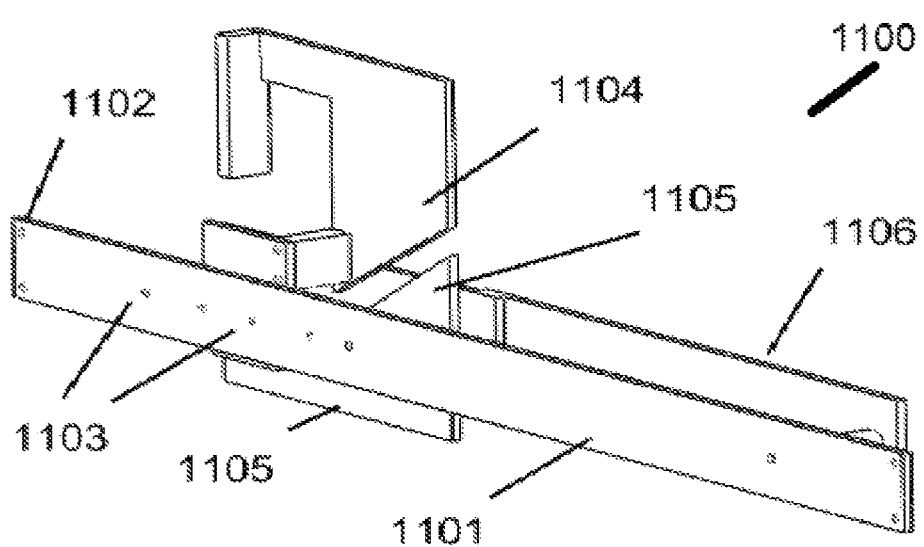
FIG. 11 is a perspective view of a guide assembly from the looped instrument collator of FIG. 6A.

FIG. 11 shows the complete guide assembly 1100 for one embodiment. A cross piece 1101 acts as a means of attachment to the catch and release base 701 using attachment holes 1102. The cross piece additionally provides points of attachment 1103 for the upper guide 1104, lower guide 1105, and rear guide 1106.

Figure 12:
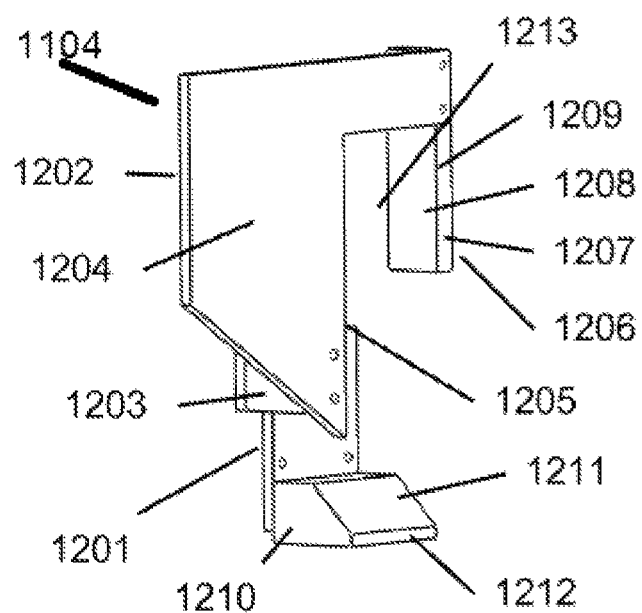
FIG. 12 is a perspective view of an upper guide of the guide assembly of FIG. 11.

FIG. 12 shows the upper guide 1104 of the guide assembly of FIG. 11. The upper guide 1104 is attached to a cross piece using the attachment plate 1201. The upper guide plate 1202 is attached to the attachment plate by means of a spacer block 1203. Functional elements of the upper guide plate include the upper face 1204 and the right arm pivot edge 1205. The left loop guide 1206 is attached to the upper guide plate and includes the functional elements of left loop face 1207, right loop limiter 1208 and right loop limit edge 1209. The right loop angle guide 1210 is attached to the bottom portion of the attachment plate 1201. Functional elements of the right loop angle guide include the angle surface 1211 and the right loop face 1212.

Figure 13:
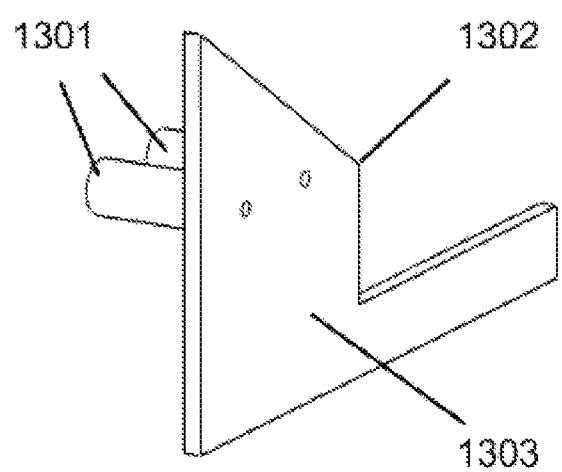
FIG. 13 is a perspective view of a lower guide of the guide assembly of FIG. 11.

FIG. 13 shows the lower guide of the guide assembly of FIG. 11. The lower guide is attached to the cross piece by means of spacers 1301. The lower guide includes the lower guide plate 1302 with the functional element lower guide face 1303. Certain embodiments do not include a lower guide.

Figure 14:
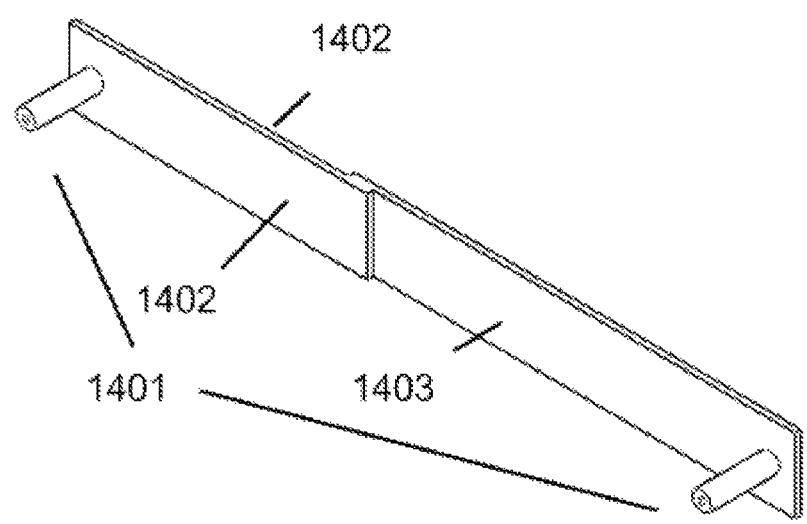
FIG. 14 is a perspective view of a rear guide of the guide assembly of FIG. 11.

FIG. 14 shows the rear guide of the guide assembly of FIG. 11. Spacers 1401 are used to attach the rear guide plate 1402. The rear guide plate 1402 has the functional element rear guide face 1403. Some embodiments also have a recessed face 1404, which provides clearance for tip depth.

In one embodiment of the guide assembly, the upper face 1204, left loop face 1207, lower loop face 1212, and lower guide face 1303 are coplanar. These faces are generally referred to as the front guide faces. In other embodiments, the front guide faces are parallel, but not necessarily coplanar. In another embodiment, the front guide faces are parallel to the rear guide face 1403. The space between the front guide faces and the rear guide face is the instrument fall slot. The width of the instrument fall slot is sufficient to permit thick instruments to pass. One embodiment maintains this distance at 0.25", but other embodiments may increase or decrease this measurement.

Figure 15:
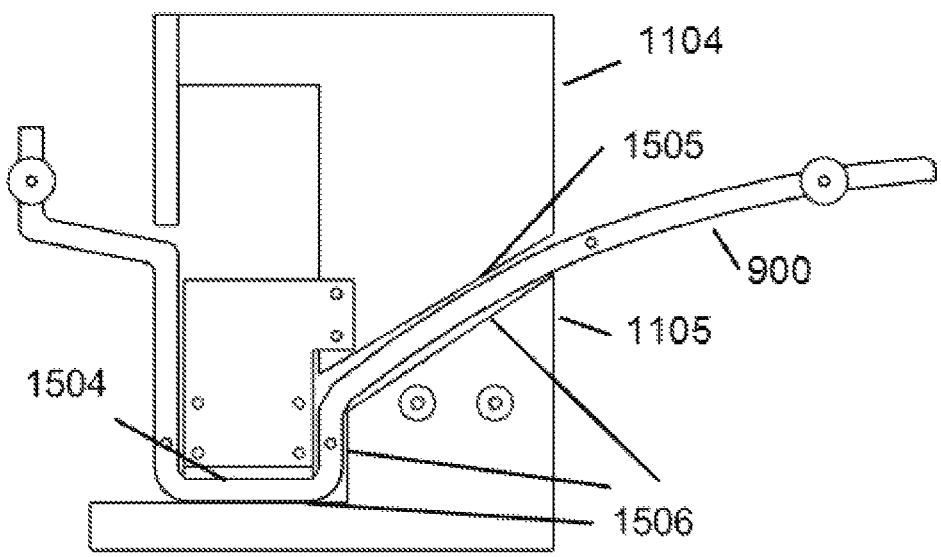
FIG. 15 is a side view of an assembly of the upper guide of FIG. 12, the lower guide of FIG. 13 and the instrument catch contour of FIG. 9.

FIG. 15 shows an assembly of the upper guide 1104, lower guide 1105, and the instrument catch contour 900. The edge along the bottom of the right loop face 1504 and the edge along the angled bottom of the upper guide face 1505 combine to form the upper boundary of the instrument catch slot. The top edge of the lower guide face 1505 running horizontally, then vertically, and then at an angle combine to form the lower boundary of the instrument catch slot.

Automated Rack

Figure 16:
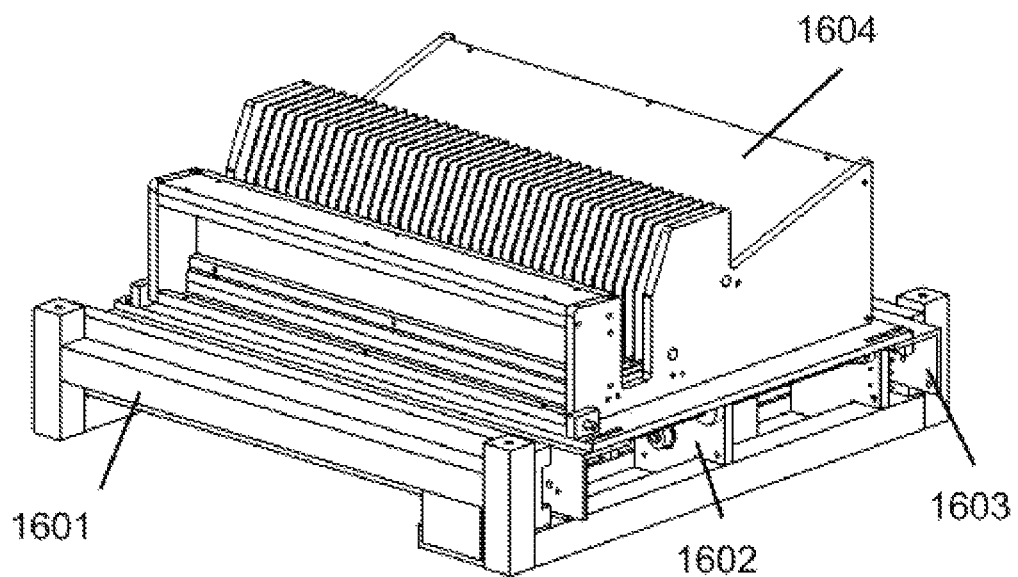
FIG. 16 is a perspective view of the automated rack of the looped instrument collator of FIG. 6A.

FIG. 16 shows the automated rack 603 from the looped instrument collator of FIG. 6. Subassemblies of the automated rack include an automated rack body 1601, a drive assembly 1602, a sliding rack mount 1603, and a rack 1604.

Figure 17:
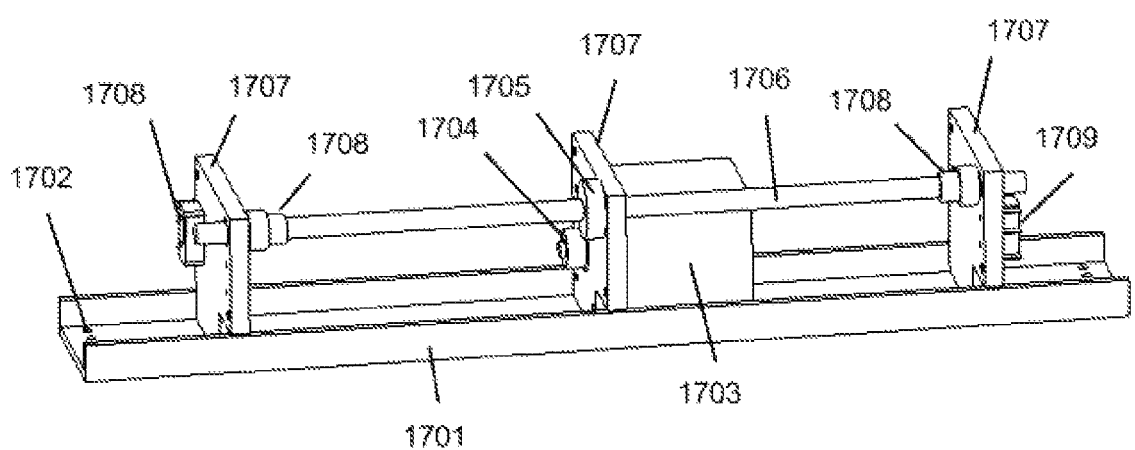
FIG. 17 is a perspective view of a drive assembly according to principles of the invention.

FIG. 17 shows the drive assembly 1602 of FIG. 16. A drive frame 1701 attaches to the automated rack body 1601 using mounting holes 1702. A stepper motor 1703 is attached to the drive frame 1701. Attached to the stepper motor drive shaft is a motor timing pulley 1704. The motor timing pulley 1704 drives a timing belt (not shown) which engages a second timing pulley 1705 attached to the drive shaft 1706. The drive shaft spans the left, center, and right drive guides 1707 of the frame 1701. Left and right spur gears 1708 are attached to the drive shaft proximal to the left and right drive guides. Relative to the stepper motor 1703, the spur gears are on the near side of the drive guides. Two switches are attached on the far side of the left and right drive guides. The right switch 1709 is located towards the front edge of the right drive guide with its actuator facing backwards. The left switch 1710 is located towards the rear edge of the left drive guide with its actuator facing forwards.

Figure 18:
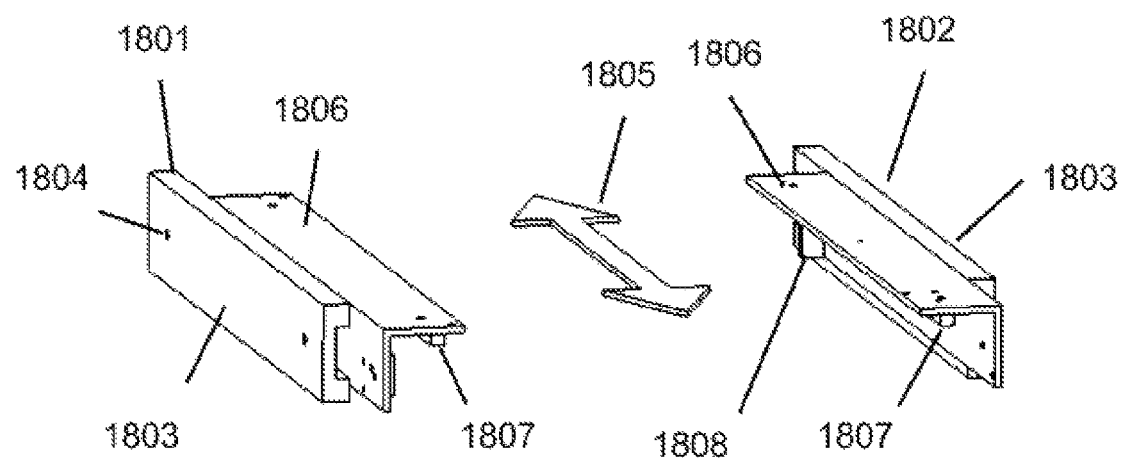
FIG. 18 is perspective view of a left sliding rack mount and a right sliding rack mount of the drive assembly of FIG. 17.

FIG. 18 shows the left and right sliding rack mounts of the automated rack of FIG. 16. For certain embodiments, both left 1801 and right 1802 mounts have corresponding left and right drawer slides 1803 which are attached to the body 1604 using mounting holes 1804. The drawer slides allow for linear motion in the direction indicate by arrow 1805. Other configurations for linear motion are possible within the scope of the invention. Attached to the drawer slides are left and right slide brackets 1806. Attached to both slide brackets are gear racks 1807 which span the full length of the slide brackets. Switch activators are attached to both slide brackets with the right switch activator 1808 located at the rear of the slide bracket and the left switch activator (not shown) located towards the front of the slide bracket.

Figure 19:
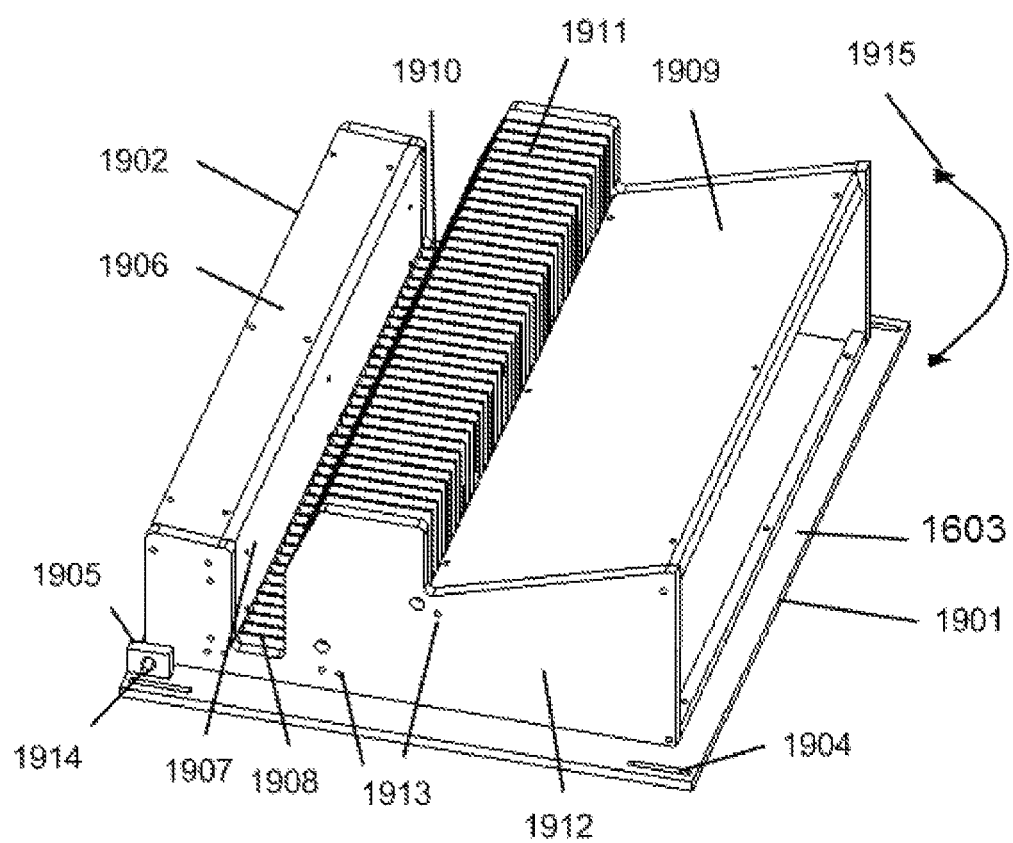
FIG. 19 is a perspective view of a rack mount with a rack assembly according to principles of the invention.

FIG. 19 shows an alternative perspective view of the rack mount 1901 and rack assembly 1902. The rack mount consists of a plate 1903 with mounting slots 1904 for attachment to the slide brackets 1801, 1802. Some embodiments of the rack mount use pillow blocks 1905 for attachment of the rack assembly.

The rack assembly 1902 has four surfaces for instrument support. They are the left loop rest 1906, the loop separator height 1907, right loop rest 1908, and tip rest 1909. In one embodiment, stored instruments are isolated from one another by the right loop separator assembly 1910, and the body separator assembly 1911. The rack assembly has front and rear face plates 1912. Both face plates have mounting holes 1913 for attaching the surfaces and the separator assemblies. In one embodiment, the rack assembly has mounting shafts 1914 for attachment to the pillow blocks 1905. This means of securing provides the rack assembly with rotational freedom about the mounting shafts' axis, as indicated by arrow 1915.

Figure 20:
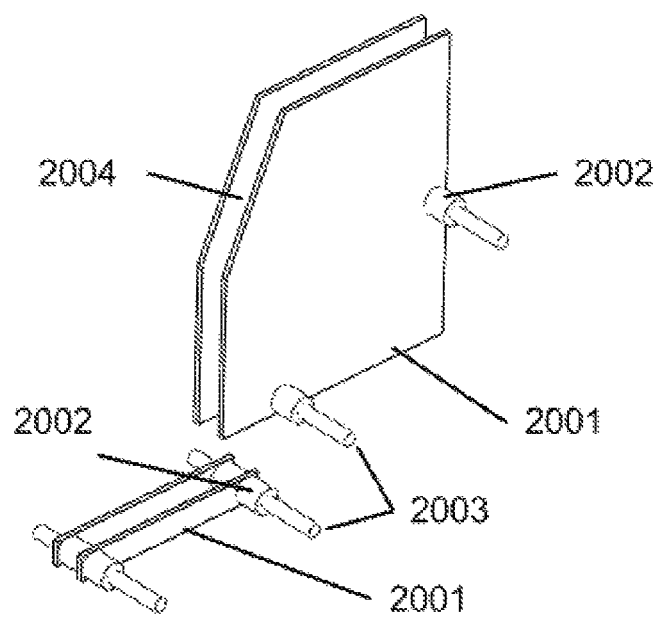
FIG. 20 is a perspective view of a right loop separator assembly with a body separator assembly according to principles of the invention.

FIG. 20 shows the right loop separator assembly and the body separator assembly. Each segment of either separator assembly consists of a plate 2001 and two spacers 2002. The plates and spacers have holes for alignment upon rods 2003. An instrument slot 2004 consists of the space defined by two opposing faces of adjacent separator plates. The space thickness is defined by the length of the spacers.

In other embodiments, the rack assembly can be quickly disconnected from and reconnected to the rack mount. In such cases, the rack could be removed for washing, with or without instruments present in the slots.

Other embodiments of the rack assembly are assembled of wireframe construction. Such embodiments may have the same general outlines and functional components as described for the embodiment shown in FIG. 19.

With the drive assembly 1602 and sliding rack mount 1603 attached to the body 1601, the spur gears 1708 mate with the gear rack 1807. Actuation of the stepper motor turns the drive shaft and the spur gears. The spur gears then engage the gear rack resulting in extension or retraction 1805 of the drawer slides. With the rack mount assembly attached to the slide brackets, extension and retraction of the drawer slides results in forward and reverse motion of the rack assembly 1604. At a particular extension of the drawer slide, the left switch activator 1808 engages the left switch 1708, producing an electrical signal indicating the furthest desired extension has been reached. At a particular retraction of the drawer slide, the right switch activator 1808 engages the right switch 1709, producing an electrical signal indicating the greatest retraction has been reached.

Operation of the First Embodiment of a Looped Instrument Collator

FIG. 21 is a flow chart showing the operation of the instrument collator of FIG. 6A.

At step 2101, the electronics controller 604 receives position information from the CPU 605. After a slot number for the current looped instrument being examined is identified, the electronics controller 604 receives corresponding position information sent from the CPU 605. This communication initiates rack motion. To determine the number of slots in the rack that must be stepped, the current step position is subtracted from the step position of the desired slot. In one embodiment, a negative number indicates the retracting direction, and a positive number indicates the extending direction.

In one embodiment, the electronic controller maintains the current step position and carries out the step number calculation. In this case, the CPU sends the instrument slot number to the electronic controller to initiate motion of the automated rack. In another embodiment, the CPU maintains the current step position and carries out the step number calculation. In this case the CPU can send the number of steps and the direction to the electronic controller to initiate motion.

At step 2102, the electronics controller 604 issues motion commands to the automated rack 2102. Once motion has been initiated, the electronics controller begins commanding the stepper motor to take steps 2102. When the stepper motor has taken its last step and the rack has reached its destination, the electronics controller sends a signal to the CPU indicating rack motion is complete.

At step 2103, the instrument collator waits for the instrument to be in the instrument catch and for the automated rack to reach its commanded position. The next step for looped instrument collator operation is to wait for drop readiness. When the looped instrument is properly resting in the instrument catch contour, and the automated rack has concluded its motion, collator operation may proceed.

In embodiments which utilize a conveyor such as the instrument collator of FIG. 6B, the looped instrument approaches the end of the conveyor belt as the rack moves to the assigned slot. At the end of the conveyor, the instrument transitions into the instrument catch. To begin the transition, the right loop 504 cantilevers off the edge of the conveyor 606. The right loop may then glance off of either the right arm pivot edge 1205 or the right loop limit edge 1209 as it proceeds through the right loop guideway 1203. The right arm 505 then strikes the right arm pivot edge 1205. The instrument then rotates about the axis at the point of contact, perpendicular to the surface of the conveyor. Resultant of the rotation, the right loop and both tips are no longer supported by the conveyor, and the right loop and tips angle downward. Next the left tip hits the tip rest 908, creating an axis of rotation at the point of contact, perpendicular to the face of the contour 703. Resultant of this rotation the left loop angles down towards the left loop rest 903. The right segment then rotates about the hinge. As the right loop falls, it may glance off of the right loop limiter 1208 or the angle surface 1211. These surfaces guide the right loop into the right loop basin 904. Eventually the right loop comes to rest on the right loop rest 907 and the transition is complete. In one embodiment sensors on the instrument catch send electronic signals to the CPU to indicate the transition is complete. In other embodiments, the process is presumed to be complete after a defined time.

In free standing embodiments of the instrument collator such as that shown in FIG. 6A, a user places a looped instrument into the instrument catch. The instrument is preferably placed such that the appropriate instrument components are resting upon the corresponding contour surfaces.

At step 2014, the solenoid is activated and the instrument drops. Once the instrument is present in the instrument catch and the automated rack is in the correct position, the CPU issues a command to the electronics controller to release the instrument 2104. One embodiment adds a delay of ½ second before releasing the instrument. To release the instrument, the electronics controller emits a signal which energizes the coil of the solenoid 801. This causes the solenoid rod to extend. The cross member 804 moves with the rod as the cross member 804 is attached to the rod. The right rack assembly 805 then engages the right spur gear 806, causing the drive shaft 807 to rotate. The left spur gear rotates along with the shaft, and engages the left gear rack. This provides a force parallel to the solenoid rod at the opposite end of the cross member, ensuring proper motion of the cross member.

As the solenoid rod extends and the cross member slides, the instrument contour is pulled away from the rear guide 1106. Before the solenoid is activated, the looped instrument is at rest on the instrument contour with the left loop on the left loop rest, the right loop on the right loop rest, and the left tip on the tip rest. Motion of the instrument contour away from the rear guide will pull the looped instrument away from the back rest.

The looped instrument travels with the instrument contour until the left loop contacts the left loop face 1207, the right loop contacts the right loop face 1212, and the left and right arms contact the upper face 1204. The instrument contour then continues to travel through the instrument contour slot. As each rest area of the instrument contour ceases to support the corresponding instrument portion, the instrument will fall through the instrument fall slot.

The rack is aligned with the instrument catch such that after the instrument falls, the left loop will land on the left loop rest 1906, the right loop will land on the right loop rest 1908, and the tip will land on the tip rest 1909. In one embodiment, the CPU waits ½ second after activating the solenoid to de-activate it. Upon removing power to the solenoid, the return springs push the cross member back towards the back rest, and the gear racks and spur gears work in the reverse fashion as the activation.

Looped Instrument Collator

Second Embodiment

FIG. 22 shows a second embodiment of a looped instrument collator. The looped instrument collator includes a highlighting rack 2201 which is connected to an electronics controller 2202. The electronics controller receives commands from a CPU 2203.

The highlighting rack 2201 has four functional surfaces for instrument support. Those surfaces are the left loop rest 2204, the loop separator height 2205, right loop rest 2206, and tip rest 2207. The highlighting rack may hold a plurality of looped instruments. Looped instruments are held individually in a plurality of instrument slots defined by a body separator assembly 2208. Each instrument slot has a corresponding indicator light 2209.

In some embodiments, the rack may be easily detached from the indicator lights. The attachment/detachment mechanism allows for easily positioning the rack such that the lights and slots are properly aligned.

Operation

FIG. 23 is a flow chart showing the operation of the looped instrument collator of FIG. 22. At step 2301, the electronics controller 2202 receives a slot number from the CPU 2203. At step 2302, the electronics controller 2202 issues a signal to illuminate the indicator light 2209 which corresponds to the received slot number. At step 2303, the user inserts the looped instrument into the slot indicated by the light.

Operation of the Instrument Inventory System

System Operation

FIG. 24 is a flow chart of the operation of the inventory system according to one embodiment.

At step 2401, the inventory system is launched, i.e. the inventory system is powered up and the operating system and software are initialized. In one embodiment, the system operates as a kiosk. In such cases, the software automatically runs when power is applied to the inventory system. In other embodiments, the inventory system software may be a desktop application. In this case, the user would choose to start the system software.

At step 2402, the software establishes a connection with the database. In some embodiments, the inventory system uses the MySQL relational database, but other types of relational database may be used in alternative embodiments. Information related to database connection is stored in the system software. In embodiments where the database is stored remotely, the stored information includes the IP address and other relevant information. For embodiments where the database is stored locally, a local host connection is used.

At step 2403, the user enters general data concerning usage via a startup screen. Following the successful establishment of a database connection, the inventory system presents the user with one or more start up screens. The start-up process is used to gather values for data which are likely to be consistent for the extent of the ensuing usage of the system. This may include but is not limited to the facility, the session, and the user.

In one embodiment, the start up screen presents the user with a list of known facilities. Selecting a facility from the list sets the selected facility as the current facility. If the desired facility is not present in the list, the user may enter the name of the unlisted facility. In some embodiments, the new facility will be inserted as a record into a facilities table and available for selection on future system start ups. One embodiment of the system may allow for not selecting a particular facility.

In another embodiment, the inventory system automatically creates a new session at start up and sets it as the current session. In some embodiments, this newly created session is also inserted as a record into a sessions table. The inventory system assigns a formatted string of the date and time as the name of the session. In further embodiments, the inventory system presents the user with a list of prior sessions which the user may choose to continue. The inventory system also presents the user with the option to create a new session.

Other embodiments of the inventory system may include a username and password entry field to associate the session with a particular user. In some embodiments, different users are afforded different levels of access to system features. In other embodiments, the user may scan an ID badge to gain access to the system.

At step 2404, system operation proceeds with the user selecting values and options specific to the instruments about to be processed. This step is described in greater detail below with regard to FIG. 25.

At step 2405, the user then processes the instruments. This step is described in greater detail below with regard to FIG. 26.

At step 2406, when that group is complete, another group may be entered, or the system proceeds to step 2407, system exit.

Select Group/Entry Mode

FIG. 25 is a flow chart of step 2402 of FIG. 24, the group type and entry mode selection process. Proceeding from start up, the user then selects the group type and the entry mode for the following group of instruments.

At step 2501, in one embodiment, the group type selection process is the decision of whether or not to use a Unique ID Reader as the external input device 110. This decision is typically based on whether the system has a Unique ID reader and whether or not the instrument group has a readable unique ID such as a barcode or RFID tag.

If the answer to step 2501 is no, the inventory system proceeds to step 2502 where the inventory system presents a list of known groups to the user.

At step 2503, the user selects a group value from the list presented in step 2502 to apply to the instruments to follow.

At step 2504, the inventory system determines if the selected group has an instrument list. If yes, the inventory system proceeds to step 2505. If no, the inventory system proceeds to step 2506.

At step 2505, some embodiments of the inventory system display the list upon selection of the group. The inventory system the proceeds to step 2506.

In step 2506, the user determines if the group of instruments has an instance marking. It is typical for a hospital or other facility to have several of particular groups of instruments. For example, the Minor Basic Set is a frequently used set of instruments, and a hospital is likely to have multiple instances of it. These multiples may be individually marked to be uniquely identified. If the user determines that there are instance markings, then, in some embodiments, the inventory system proceeds to step 2507. If there are no instance markings, the inventory system proceeds to step 2511.

At step 2507, some embodiments of the inventory system allow the user to enter the instance marking as the Unique Identifier for the Group Entry. For example, "Minor Basic Set 13" may encompass the type and instance of an instrument group.

If at step 2501, there is a unique ID reader, the inventory system proceeds to step 2508.

At step 2508, the user uses the unique ID reader to read an instrument identifier. In certain embodiments where a unique ID reader is employed, the read ID may be transmitted to a third party software system to enter and retrieve data regarding that particular instrument group.

At step 2509, the inventory system once the unique ID is read, the system determines whether the identifier is known.

If the marking is known, the inventory system proceeds to step 2510. At step 2510, the system retrieves values for the particular Group Type and Instance which it represents are retrieved and entered into the database. If the marking is unknown, the unique ID is stored in the database and linked to the selected group type and instance for future use. The inventory system then proceeds to step 2503 and the inventory system continues as described above.

At step 2511, the user selects the mode of processing. Some embodiments have three options: load, validate, and build. While some embodiments have all three load options, it should be understood that an embodiment with any combination of the three or merely a default mode is possible within the scope of the invention.

At step 2512, the inventory system assigns the selected mode and then creates a Group Entry. In some embodiments, the system will insert the selected values as a record into a Group Entry table. All three mode of processing options assign the newly created group entry as the group entry value to the subsequent instrument entries. Additionally, the validate option compares the subsequent instruments with the Group's instrument list to ensure inclusion and completion. Further to validation, the build option uses an attached looped instrument collator to aid in the building of a set and stringer.

In some embodiments, if a user chooses to not assign a group to the instruments, the instruments are assigned to a default group. For example, instrument entries may be applied to a group with the name "Loose Instruments." Additionally, if a group is not chosen, some embodiments of the system set the entry mode to load. Further, some embodiments may have default mode of processing regardless of whether the user selects a group.

Instrument Processing

FIG. 26 is a flow chart of step 2405 of FIG. 24, i.e., instrument processing. In instrument processing, the user uses the inventory system to enter values relating to the instruments being processed. In some embodiments of the inventory system, these values are stored as instrument entries in the database. Creating an instrument entry involves selecting values for the various aspects of an instrument entry. When a value is selected, that value is referred to as the selected value or as the current value. For example, the value selected for the manufacturer of the instrument may be referred to as the current or selected manufacturer. Storing an instrument entry involves inserting the selected values as a record into the instrument entry database table 304. In some embodiments of the inventory system, particular values which pertain to aspects of the instruments are selected outside of the instrument processing procedure. These may include, but are not limited to, the facility, session, and group entry.

FIG. 26 is flow chart of one embodiment of instrument processing. At step 2601, the user performs several steps to initiate instrument processing. This process is described in greater detail below with regard to FIGS. 27A and 27B.

At step 2602, the system processes the instrument. This process is described in greater detail below with regard to FIG. 28.

At step 2603, the user selects values for the aspects of the instrument with inputs selected from a user interface. The values for selection typically include, but are not limited to, instrument type, manufacturer and vendor identification. Some embodiments of the inventory system may require the selection of values for specific aspects before continuing to the confirmation step. For example, if the entry mode is either validated or build, the instrument type must be selected. Instances of instrument processing for which the required values cannot be determined are canceled. The value selection process will be described in greater detail below with regard to FIGS. 32 and 33.

At step 2604, the inventory system confirms the values selected in step 2603. The confirmation process will be described in greater detail below with regard to FIG. 34.

At step 2605, the inventory system determines whether there are more instruments in the group to be processed. If yes, the program flow repeats, with the inventory system returning to step 2601. Otherwise, the inventory system proceeds to step 2606 and returns to step 2406 of system operation as shown in FIG. 24.

User Initiate

FIG. 27A and FIG. 27B show the process of step 2601 of FIG. 26 in greater detail. In one embodiment, instrument processing begins with one or more actions performed by the user. FIG. 27A and FIG. 27B show two embodiments of the user initiation process. FIG. 27A shows a first embodiment in which the inventory system uses a fixed unique ID reader. FIG. 27B shows a second embodiment in which the inventory system uses a tethered unique ID reader. The unique ID Reader may be, for example, an RFID tag reader, a barcode scanner, or a similar device. Use of such a device would typically provide a value for the unique ID field of the instrument entry.

In FIG. 27A, at step 2701, the inventory system has a fixed unique ID reader and the user initiation begins with the user retrieving and placing an instrument within the instrument placement zone of the instrument identification system. Some instrument types may have a preferred orientation or location within the placement zone for processing purposes. While the user is retrieving and placing the instrument, the unique ID Reader is continuously scanning for identifiers.

At step 2702, the inventory system reads the identifier. In some embodiments, the inventory system also displays the value of the identifier. If the identifier is already known to the inventory system, the inventory system retrieves the stored data for the identifier. This may include, but is not limited to, instrument type, manufacturer, and vendor identification.

At step 2703, if the identifier is unknown, the inventory system issues and analyze instrument command internally, and proceeds to a process of analyzing the instrument, step 2602 of FIG. 26 and described in detail below with regard to FIG. 28.

In FIG. 27B, the inventory system uses a tethered or user-operated unique ID reader. Alternatively, the inventory system does not have a unique ID reader. Some embodiments request a value for the unique ID in order for an instrument entry to be valid. In FIG. 27B, at step 2704, the inventory system decides with a value for the unique ID is needed for a valid instrument entry. If a unique ID value is need, the process continues to step 2705.

At step 2705, the user implements the Unique ID Reader. In some embodiments, the inventory system also displays the value of the identifier. If the identifier is already known to the inventory system, the inventory system retrieves the stored data for the identifier. This may include, but is not limited to, instrument type, manufacturer, and vendor identification.

If the Unique ID is not required, the process continues to decision step 2706. The user may still use a Unique ID Reader, in which case program flow continues to step 2705. The user may choose not to use a Unique ID Reader if the system does not have one or if the current instrument does not have a unique ID and proceeds to step 2707.

At step 2707, the user places the instrument within the placement zone.

At step 2708, the user issues a command to the inventory system to analyze the instrument. The command may be issued by means of an external button, a button on a touch screen user interface, a voice command, foot pedal, or any other such means of inputting direction to a computer system. In some embodiments, the inventory system may sense when the instrument has been placed on the conveyor. The inventory system may use a camera, weight measurement device, or other sensor to determine the presence of an instrument and issue the system processing command, step 2602 of FIG. 24 and described in detail below with regard to FIG. 28.

System Processing

FIG. 28 is a flow chart of the system processing step from the operation of instrument processing, step 2602 of FIG. 26. At step 2801, the inventory system processes begins with sensor data acquisition. At step 2802, the inventory system analyzes the data. At step 2803, the inventory system scores the data, also referred to as "measurement scoring."

FIG. 29 is a flow chart of the process of sensor data acquisition for those embodiments of the inventory system using an instrument imaging device 205 shown in FIG. 2B.

At step 2901, the inventory system instructs the height measurement device to begin taking readings.

At step 2902, the inventory system instructs the conveyor's stepper motor 204 to take a specified number of steps. The number of steps correlates with transporting the surgical instrument from the instrument placement zone 203 to the viewing area 206. Over the course of this motion, the instrument will pass in front of the height measurement device 2903.

At step 2904, the inventory system waits for the conveyor to complete its move.

At step 2905, the inventory system acquires height data from the height measurement device.

At step 2906, the system commands the camera to take a picture of the presented instrument. In one embodiment, multiple images are taken. In other embodiments, different lighting arrangements may be used for different images. In further alternative embodiments, multiple cameras using different perspectives may be used. The image or images for the instrument being processed are generally referred to as the current image or images.

FIG. 30 is a flow chart of the data analysis step 2802 of FIG. 28. The data analysis process converts acquired data into a quantitative representation of the instrument being processed. System software of the inventory system performs machine vision analysis on images supplied by the instrument imaging device using known methods in the art of machine vision.

At step 3001, the inventory system begins by threshold filtering to isolate the instrument pixels from background pixels.

At step 3002, the inventory system uses contour algorithms to assess basic aspects of the instruments shape, and from that, the inventory system determines the category of the instrument. As an example, some embodiments may check if an instrument has finger loops. If so, instrument is assigned the looped instrument category.

At step 3003, the system then takes prescribed measurements, based on the instrument category, relevant to discerning specific instrument types within the particular category. Typical measurements include the length, width, and area of the instrument.

FIG. 31 is a flow chart of data scoring step 2803 of FIG. 28.

At step 3101, the inventory system retrieves training data from the training data Table.

At step 3102, some embodiments of the inventory system filter the retrieved training data. If the embodiment does not filter the retrieved data, the current measurements are scored against all of the training data. Filtering refers to removing training data instances because they fail a particular test.

Different embodiments may filter retrieved training data according to different features. Some embodiments filter according to instrument category, thereby scoring the measurements against only those stored measurements which pertain to the same category. Other embodiments filter according to instrument length, thereby scoring the measurements against only stored measurements which pertain to an instrument of the same length or within a range of lengths. If the entry mode is either validated or build, the system may filter to include only instruments that are in the instrument list for the current group. Other embodiments may use any feature or combination thereof to filter the trained data.

At step 3103, the inventory system proceeds to scoring the measurements. For each retrieved record of trained data, stored measurements are scored against corresponding measurements of the current image data. For example, the width measurement of the trained data would be compared to the width measurement of the current image data. After all of the measurements are scored, the instrument type of the trained data is put into a list with the derived score.

To determine the score, some embodiments use a factor and weight methodology for each measurement. The factor is indicative of the proximity of the trained data value to the current measured value. The weight is indicative of the relative importance of the particular feature with regard to instrument type discernment. The score for each measurement is the product of the determined factor and the weight. The score of a trained data record is the sum of the products for all of the measurements. Other embodiments use a range and weight methodology. In this case, if the trained data measurement is within a range surrounding the current image data measurement, the full weight is counted. The score of a trained data instance is the sum of the counted weights.

At step 3104, the results of the data scoring are pruned. To begin, the list of trained data instrument types and scores are sorted by score from highest to lowest. After the list is sorted, it is then pruned. In pruning, for each instrument type, only the trained data record with the highest score is retained. The rest are removed from the list.

In other embodiments, whether or not a particular instrument type is listed in the group is an aspect in determining the score for that type. For example, the same instrument type may receive a score 90 if not present in the group, or 100 if it is present in the group.

FIG. 32 shows a decision tree of the step of value selection, step 2603 of FIG. 26. The user selects values for the different aspects using a user interface. In one embodiment, values may be selected in any order. Any combination of instrument type and manufacturer has exactly one vendor identification. Because of this relationship, some embodiments of the system react to values as they are selected. Because the vendor identification, manufacturer, and instrument type are linked, the available selections vary depending on the selected data.

At step 3201, as a first step in the decision tree, the inventory system checks if an instrument type has been selected. If yes, the application flow proceeds to decision step 3202. If no, the application flow proceeds to decision step 3203.

At step 3202, the inventory system checks if a manufacturer has been selected. If yes, the application flow proceeds to decision step 3203. In one embodiment of the system, the manufacturer is selected from a row of buttons. In another embodiment, the manufacturer may be selected using voice recognition. The list of manufacturers may vary depending on the current facility.

In step 3203, the system checks if there is a known vendor identification corresponding to the selected manufacturer and instrument type. If yes, the system proceeds to step 3204 and displays and selects that Vendor ID. If no, at step 3205 the user may choose to enter the vendor identification manually 3205. The user may use an external keyboard or in other embodiments an on screen keyboard to input the characters of the identification.

In some embodiments, the inventory system may update the list of manufacturers after the instrument type is selected. The updated manufacturers may be sorted by the most frequent manufacturer of that particular instrument type for the given facility. In another embodiment, the list of manufacturers may be limited to include only those which have a record in a vendor identification table corresponding to the selected instrument type. In other embodiments, the inventory system highlights those manufacturers with corresponding vendor identifications.

If an instrument type has been selected, but the manufacturer is not selected, application flow for some embodiments proceeds to step 3206. In step 3206, the inventory system displays the known vendor identifications for the selected instrument type. This may be helpful if the manufacturer logo is hard to find or read for the current instrument.

At decision step 3207, if the correct identification is displayed, the user may select it at step 3208. If not, the user may enter the identification manually at step 3205.

If the instrument type is not selected, the answer to decision step 3201 is no and program flow proceeds to step 3209 in which the inventory system checks if the manufacturer is selected. If the answer to step 3209 is yes, program flow for some embodiments proceeds to step 3210. In step 3210, the inventory system displays a list of the known vendor identifications for the instruments in the trained instrument list generated by step 3104. This may be helpful if the user is unfamiliar with the particular instrument type, but the markings are readable. At decision step 3211, if the correct identification is in the list, the user may select it in step 3212. If not, the user may enter the identification manually at step 3205.

If neither the instrument type nor the manufacturer are selected, program flow continues to step 3213. At this step, the user may manually enter the identification.

At decision step 3214, the system determines if the vendor identification is known.

At step 3215, if the vendor identification is known to the system, the corresponding instrument type and manufacturer are retrieved from the vendor ID table 303 and set as the selected values.

Instrument Type Selection

FIG. 33 is a flow chart showing the process of instrument type selection in greater detail.

At step 3301, in some embodiments, the inventory system uses an algorithm to determine if a particular instrument's score distinguishes it as the correct instrument type.

If the answer to step 3301 is yes, the inventory system proceeds to step 3302, and the instrument type is set as the selected instrument type. This instrument is generally referred to as the "winner." In a first embodiment, the inventory system stores a threshold score to be used in this step. If only one instrument type exceeds the threshold, that instrument is labeled as the correct instrument. In another embodiment, the inventory system subtracts the top scoring instrument from a maximum possible score for value 1 and subtracts the second highest score from the top score for value 2. If value 2 is greater than value 1, the top score corresponds to the correct instrument.

At step 3303, the inventory system determines if the user has permission to disagree with the selection of a winner. If yes, program flow continues to step 3304, where the user may decide to disagree with the selected winning instrument type. If the user disagrees, application flow proceeds to step 3306. Otherwise, the winner is the selected instrument type at step 3305.

If there is no winning instrument type, the answer to step 3301 is no and application flow proceeds to permission step 3306. If the user is granted permission to select from the trained instrument list, the answer is yes and the inventory system presents the list of scored instrument types to the user. If the correct instrument is in the list, decision step 3307 is answered yes and the user may choose it for the selected instrument at step 3308. In one embodiment, the list is presented as a column of buttons, each labeled with a specific instrument. In this case the user presses the button corresponding to the correct instrument. In another embodiment, the system uses voice recognition, and the user annunciates the name for the correct instrument.

If the correct instrument is not in the list of trained instruments, application flow proceeds to permission step 3309. If the user is granted permission to select from the known instrument list, the system presents a list of instruments which are known to the system, but not trained. This classification of instrument has a known instrument type, but the type does not have any corresponding entries in the trained data table 302. In further embodiments, the list of untrained yet known instruments may be reduced to those with the category matching the currently processed instrument. In further alternative embodiments, the list of untrained yet known instruments may be reduced to those with a length matching the instrument in question. It is understood that the system could limit the list to a defined set of matching qualities or combination thereof. If the correct instrument is in the list, decision step 3310 is answered yes and the user may choose it as the selected instrument at step 3311.

If the correct instrument is not in the list of know yet untrained, step 3310 is answered no and application flow proceeds to permission step 3312. If the user is granted permission to enter an unknown instrument type, the user may manually enter the instrument type into a text field at step 3313. The type name may be entered using an external or onscreen keyboard. Submitting the typed value chooses it as the selected instrument type.

If for any of the permission steps described above the step is reached and the user is not granted permission, program flow continues to step 3314 and no instrument type is selected. Additionally, the user may be granted permission at any of the above described steps, but be unfamiliar with the instrument type. In this case the user would not select an instrument type.

It is understood that different embodiments of the system may truncate the above selection cascade at any point. For example, an embodiment may allow for selecting from trained instruments, but nothing beyond that including known yet untrained, or manually entered unknown instruments.

Repeated Instrument Type and Manufacturer

After selecting an instrument type, the user may choose to hold that particular instrument type for subsequent instrument processing cycles. The user makes this decision in the event that they intended to process several of the same instrument type successively.

After selecting a manufacturer, the user may choose to set the selected manufacturer as repeated data. The user chooses to do this in the event that the user intended to process several instruments of the same manufacturer successively.

Confirm

FIG. 34 is a flow chart of the confirmation process, step 2604 of FIG. 26.

At step 3401, the user initiates confirmation. When the appropriate values are selected for the various fields, confirmation may be initiated. For typical embodiments of the system, the user presses a button on the touch screen to initiate the confirmation. In other embodiments, the user may use voice recognition. Further embodiments may use a foot pedal or any other means. In other embodiments, the system software may initiate confirmation. In such embodiments, the system may initiate confirmation if a particular instrument type has such a score as to declare it the winner, as described above in step 3302 of instrument selection process of FIG. 33.

At step 3402, the inventory system, in some embodiments, checks whether to include a value for the stored image field of the instrument entry. A typical instance when the inventory system includes the image is if the instrument type remains unselected. Other embodiments may be set to store the image for every instrument entry. Further alternative embodiments may be set to store an image for every instrument entry for a predetermined period of time so as to reduce storage space requirements.

If the inventory system chooses to store the image, program flow continues to step 3403 and the inventory system creates a value for the stored image field of the instrument entry. In some embodiments, the image data is inserted into a stored images table, and the value is a link to that image. In other embodiments, a file name may be the value, and the image file is saved to disk.

At step 3404, some embodiments of the inventory system check whether to train the selected instrument type with the current image. In one embodiment, the system chooses to train the image if the score of the measurements for the selected instrument type is below a predetermined threshold. In the case where the user has selected an instrument type from the list of untrained yet known instruments, the inventory system may choose to train. In the case when the user has manually input an instrument type which was unknown to the inventory system, the inventory system may choose to train. In another embodiment, the user may select whether or not to train the instrument type on the current image.

If the inventory system chooses to train the instrument type on the current image, program flow proceeds to step 3405. Training is accomplished by inserting a record into the trained data table 302. The record typically includes the measurements taken from the current image for the measurements field and the selected instrument type for instrument type field.

At step 3406, some embodiments of the inventory system check whether to store the current vendor identification. In one embodiment, the inventory system chooses to store the vendor identification if the selected vendor identification is unknown to the system. In other embodiments, the system chooses to store the vendor identification if the selected vendor identification is unknown and there are values selected for instrument type and manufacturer for the current instrument entry.

If the inventory system chooses to store the vendor identification, program flow proceeds to step 3407. A vendor identification is stored by inserting the appropriate values as a record into the vendor ID table 303. The record typically includes values for the vendor identification, the manufacturer, and the instrument type.

At step 3408, the inventory system checks if the current entry mode is either validate or build. If so, program flow continues to the validation process, step 3409, which will be described in greater detail below with regard to FIG. 35.

Following the validation process, the inventory system checks if the current entry mode is build, step 3410. If so, program flow continues with the collate process 3411.

At step 3412, some embodiments of the inventory system create a new row in the instrument entry table 304 and insert the selected values for the various fields. Upon completion of the insertion, the inventory system clears the selected values which will not apply to the ensuing instrument entry, and preserves those values which will.

Validation

FIG. 35 shows the validation process, step 3408 of FIG. 34, in greater detail. The validation process is used to ensure that the current instrument type may be ascribed to the current group.

At step 3501, the inventory system checks if the selected instrument type is present in the count sheet of the current group. If the instrument type is in the count sheet, the instrument type is considered valid and program flow continues to step 3502. If the instrument type is not listed in the count sheet, the instrument type is considered invalid and program flow proceeds to the use substitution decision step 3508. A substitution is the use of an invalid instrument type for a valid instrument type. This occurs in practice when the functionality of the invalid type replicates that of the valid type. Some embodiments allow substitutions.

In embodiments which do allow substitutions, the inventory system issues an alert and then queries the user if the user would like to use the selected instrument type as a substitution for a type which is on the set list. If the answer is 'yes,' program flow continues to step 3509. The inventory system presents a list of the instrument types found in the set. The user then selects the appropriate instrument type at step 3509, and program flow proceeds to decision step 3510.

In some embodiments, the interchangeability of the two instrument types may be saved and automatically used in future instances. In such cases, the answer to step 3510 is yes, and the substitution information is stored 3511. In some embodiments, the inventory system provides an option for limiting the interchangeability to the group being validated, or to allow the interchangeability for an entire facility. In embodiments that store substitution information, the use of stored substitutions may occur automatically. Next, program flow proceeds to decision step 3502.

In embodiments which do not allow substitutions, or if the user does not consider the instrument a suitable substitution for another in the count sheet, the answer to decision step 3508 is no, and program flow proceeds to step 3507. An alert mechanism, whether sonic or a message box on the graphic display, informs the user that the instrument does not belong in the current set, and the instrument entry is cancelled.

In decision step 3502 of the validation process, the inventory system checks if the quantity for the selected instrument type has been fulfilled. If yes, program flow proceeds to step 3507 and the instrument entry is cancelled. If no, program flow proceeds to step 3503 and the system increments the value of the current count for the appropriate instrument type.

At decision step 3504, the system determines whether all of the instruments listed on the count sheet are accounted for. If yes, program flow proceeds to step 3505. The inventory system alerts the user that the count sheet is complete. Additionally, the current group entry is closed, and the entry mode reverts to the default value. If the count sheet is not complete, the answer to decision step 3504 is no, and the inventory system returns to the confirmation process, step 3400.

Collation

FIG. 36 is a flow chart of the collation process.

At step 3601, if the selected instrument is to be placed on a stringer, the inventory system determines the slot position for the instrument. The position is determined from the order of instruments listed on the count sheet.

At step 3602, the inventory system sends the appropriate slot position information to the electronics controller of the collator.

FIG. 37 is a block diagram of the instrument inventory system according to one embodiment. A computer system 3700 including a microprocessor 3705 further includes an instrument inventory system 3710. The inventory system 3710 includes an instrument processor 3715, an instrument data analyzer 3720, and an instrument trainer 3725. The computer system 3700 further includes a database 3730, a user interface 3735 and an instrument interface 3740.

The inventory system 3705 takes in instrument data and creates data records for instruments and enables users to access data about collections of instruments. The instrument processor 3715 receives instrument data and controls the database. The instrument data analyzer 3720 receives sensor data pertaining to the instrument and performs quantitative analysis on that data and transmits the resulting data to determine the type of instrument chosen. The instrument trainer 3725 operates when the inventory system 3710 is presented with an instrument that has no record in the database 3730. The database 3730 is typically a relational database that holds records of instruments and records of groups of instruments.

In operation, the inventory system 3710 receives sensory instrument data from the instrument interface 3740 and descriptive or reference data from the user interface 3735. The instrument interface includes or is in communication with at least one instrument sensing element such as a camera or an identification reader. The instrument interface 3740 receives data from, for example, identification readers, visual and physical instrument identification systems, and from sensors including physical dimension sensors and other types of sensors. The instrument processor 3715 processes the received instrument data, searches for matches in the database 3730 and adds records to the database. An example process of matching instrument type is described above with regard to FIG. 33. In one embodiment of the invention, a level for matching, or correlation, may be set by the user. In a first example instance, the level is set to 100% meaning that all elements of the instrument record need to be found in a sensed instrument in order for a match to be declared by the inventory system. In other arrangements, 80% of the elements in the instrument record need to be found. In still further alternative arrangements, a required subset of record elements are required in a sensed instrument in order for the inventory system to find a match. In still further alternative arrangements, instrument matching is based on a percentage of deviation from instrument characteristics such as instrument measurements. In instances where the received data is indeterminate regarding whether there is a match in the database, the instrument data analyzer analyzes the instrument data 3720. The instrument processor 3715 processes the results of the data analysis and enters the processed results in the database 3730. If no matches or only low correlation matches are found in the database 3730, the instrument trainer 3725 operates to create a new record in the database. Embodiments of the operation of the processor 3715, analyzer 3720, and trainer 3725 are described above.

It is to be understood that the above-identified embodiments are simply illustrative of the principles of the invention. Various and other modifications and changes may be made by those skilled in the art which will embody the principles of the invention and fall within the spirit and scope thereof.

We claim:

1. An instrument inventory system, comprising:
   a hood creating an enclosed space within which each of a plurality of instruments is selectively receivable;
   a conveyer to load each of the selectively received instruments into the enclosed space;
   an instrument interface having at least one instrument sensing element for sensing characteristics of each of the selectively received instruments;
   a catch and release mechanism for catching and releasing each of the selectively received instruments for which the characteristics of the selectively received instrument correspond to identified characteristics for a known group of instruments for retention and for which a catch and release characteristic is present; and
   a computer having a database, the database storing instrument identification data and characteristics of each of the selectively received instruments, the database having an instrument inventory, the computer further having a hardware microprocessor, the hardware microprocessor being configured to execute:
      an instrument data analyzer that analyzes the characteristics data received from the instrument interface for each of the selectively received instruments and compares the received data with the stored instrument identification data to determine whether each selectively received instrument is confirmed for catching and release, and
      an instrument processor that receives instrument identifications from the instrument data analyzer, controls the database, and determines data to be recorded in the database thereby creating instrument records in the database for an instrument inventory, and wherein, the instrument processor further compares an identity of each selectively received instrument to identities for each of said known set of grouped instruments and determines whether each selectively received is of a type that is included in said known set of grouped instruments, wherein said known group of instruments includes two or more distinct types of instruments and wherein at least one of the two or more distinct types of instruments is not a sub-type of at least one other instrument type in the known group.

2. The instrument inventory system of claim 1 wherein the database is a relational database having a group table, an instrument entry table and a trained data table.

3. The instrument inventory system of claim 1 wherein the instrument identification data has at least one vendor identification table.

4. The instrument inventory system of claim 1 wherein in the instrument interface is an instrument identification system.

5. The instrument inventory system of claim 4 wherein the instrument identification system has at least one camera.

6. The instrument inventory system of claim 1 wherein the instrument interface is an identification reader.

7. The instrument inventory system of claim 1 wherein the instrument processor assigns values to an instrument being processed, the values to be included in a record in the database for the instrument being processed.

8. The instrument inventory system of claim 1 wherein the instrument processor determines whether an instrument does not have a high correlation to a known instrument and uses information stored in the database to develop values to assign to said instrument and to create a new record in the database for said instrument.

9. The instrument inventory system of claim 1 wherein the instrument processor validates a selected instrument type against a preselected list of instruments whereby the selected instrument type may be ascribed, to a selected known set of grouped instruments, wherein said group of instruments includes two or more types of instruments.

10. The instrument inventory system of claim 9 wherein the instrument processor ascribes to the selected group a valid instrument type for which the selected instrument type is a substitute.

11. The instrument inventory system of claim 1 further comprising a looped instrument collator wherein said collator assembles a preselected group of instruments.

12. The instrument inventory system of claim 11 wherein the instrument processor determines if a selected instrument should be placed on a stringer in order to assemble a preselected group of instruments, and if so, determines a position on the stringer for said selected instrument, sends an electronic communication to the looped instrument collator to select a slot associated with the position on the stringer and said looped instrument collator places said selected instrument in said selected slot, repeating said steps until said preselected group of instruments is assembled.

13. The instrument inventory system of claim 1 wherein the system database contains multiple instances a known set of grouped instruments and the instrument processor determines whether the identified instrument is included in a particular instance of such known set of grouped instruments.

14. The instrument inventory system of claim 1 wherein the known set of grouped instruments comprises a set of instruments used for one or more specified surgical procedures.

15. The instrument inventory system of claim 1, wherein the instrument processor determines whether the identified instrument is a substitute for an instrument included in the known set of instruments.

16. The instrument inventory system of claim 1, further comprising:
an automated rack for organizing and retaining each of the selectively released received instruments.

17. The instrument inventory system of claim 1, wherein the catch and release characteristic includes, a looped feature present for the instrument.

18. The instrument inventory system of claim 16, wherein the automated rack includes a plurality of instrument retaining features, the plurality of instrument retaining features being alignably organized to receive each of the selectively received plurality of instruments so as to place the received plurality of instruments in a predetermined order.

19. The instrument inventory system of claim 1, wherein the conveyer delivers for inclusion in an ordered arrangement each of the selective instruments having identified characteristics for the known group of instruments for retention.

20. The instrument inventory system of claim 19, wherein the instrument processor determines a position in the ordered arrangement for each of the selective instruments having identified characteristics for the known set of grouped instruments.

21. An instrument inventory system, comprising:
a conveyer to convey each of a plurality of instruments selectively received thereon;
an instrument interface having at least one instrument sensing element for sensing characteristics of each of the plurality of selectively received instruments;
a catch and release mechanism for catching and releasing each of the selectively received instruments for which the characteristics of the selectively received instrument correspond to identified characteristics for a known group of instruments for retention and for which a catch and release characteristic is present; and
a computer having a database, the database storing instrument identification data and characteristics of each of the plurality of selectively received instruments, the database having an instrument inventory, the computer further having a hardware microprocessor, the hardware microprocessor being configured to execute:
an instrument data analyzer that analyzes the characteristics data received from the instrument interface for each of the selectively received instruments and compares the received data with the stored instrument identification data to determine whether each selectively received instrument is confirmed for catching and release, and
an instrument processor that receives instrument identifications from the instrument data analyzer, accesses the database, and determines data to be recorded in the database thereby creating instrument records in the database for a received instrument inventory, and wherein the instrument processor further compares an identity of each selectively received instrument to identities for each of the known set of grouped instruments and determines whether each selectively received instrument is of a type that is included in the known set of grouped instruments.

22. The instrument inventory system of claim 21, wherein the conveyor conveys each of the plurality of selectively received instruments into an enclosed space.

23. The instrument inventory system of claim 21, wherein the catch and release characteristic includes a looped feature present for the instrument.

* * * * *